United States Patent
Takayama et al.

[11] Patent Number: 5,948,549
[45] Date of Patent: Sep. 7, 1999

[54] SINTER JOINING METHOD AND SINTERED COMPOSITE MEMBER PRODUCED BY SAME

[75] Inventors: Takemori Takayama; Yuichi Hori; Hirotaka Kato, all of Osaka, Japan

[73] Assignee: Komatsu Ltd., Tokyo, Japan

[21] Appl. No.: 08/945,231

[22] PCT Filed: Apr. 19, 1996

[86] PCT No.: PCT/JP96/01061

§ 371 Date: Oct. 17, 1997

§ 102(e) Date: Oct. 17, 1997

[87] PCT Pub. No.: WO96/33036

PCT Pub. Date: Oct. 24, 1996

[30] Foreign Application Priority Data

Apr. 19, 1995 [JP] Japan .................................. 7-093977

[51] Int. Cl.[6] ............................................. B32B 1/00
[52] U.S. Cl. .......................... 428/676; 428/548; 228/227; 228/262.4; 228/262.44; 228/262.6
[58] Field of Search ................................ 419/5; 428/618, 428/548, 676; 228/227, 262.4, 262.44, 262.6

[56] References Cited

U.S. PATENT DOCUMENTS

| | | |
|---|---|---|
| 628,427 | 7/1899 | Andersen . |
| 2,482,898 | 9/1949 | Chace . |
| 3,282,660 | 11/1966 | Pendleton et al. . |
| 3,397,445 | 8/1968 | Ulmer et al. . |
| 4,505,987 | 3/1985 | Yamada et al. ..................... 428/553 |
| 4,518,444 | 5/1985 | Albrecht et al. ................... 148/402 |
| 4,537,808 | 8/1985 | Yamamoto et al. ................. 428/36 |

FOREIGN PATENT DOCUMENTS

| | | |
|---|---|---|
| 57-101603 | 6/1982 | Japan . |
| 61-179804 | 8/1986 | Japan . |
| 64-4406 | 1/1989 | Japan . |
| 1-198407 | 8/1989 | Japan . |
| 3-36203 | 2/1991 | Japan . |
| 5-78711 | 3/1993 | Japan . |

*Primary Examiner*—Ngoclan Mai
*Attorney, Agent, or Firm*—Armstrong, Westerman, Hattori, McLeland & Naughton

[57] ABSTRACT

A sinter-joining method for forming a sinter of high quality at low cost and a sintered composite member produced by the sinter-joining method.

A tubular copper-base material is forced into a tubular iron-base material and these materials are sintered at temperatures equal to and higher than 600° C. so that the copper-base material expands and pressure-joins to the iron-base material. Then, the materials are sintered at temperatures equal to and higher than 850° C. so that the compactness of the copper-base material is increased. Through these steps, the sintered composite member containing the copper-base material joined to the inside of the iron-base material is obtained.

12 Claims, 28 Drawing Sheets

SINGLE ADDITION

SINTER JOINING METHOD AND SINTERED COMPOSITE MEMBER PRODUCED BY SAME

TECHNICAL FIELD

The present invention relates to a sinter-joining method and a sintered composite member produced by this method. More particularly, the invention relates to a sinter-joining method for joining a copper-base material to an iron-base material through sintering and a sintered joined member produced by this method.

BACKGROUND ART

For forming an integral body in which a copper-base material is received within the bore of a tubular iron-base material, one of the following prior art techniques is generally used.

(1) Casting: A molten copper-base material is cast into the bore of an iron-base material.

(2) Diffusion joining: A copper-pipe material is first inserted or forced into the bore of an iron-base material. Then, these materials are heated and diffusion-joined by utilizing the difference between their coefficients of thermal expansion and the transformative contraction of iron.

(3) Brazing: A copper-base pipe material is first inserted into the bore of an iron-base material. Then, a brazing filler metal is heated and applied in the gap between the iron-base material and the copper-base pipe material so that the filler metal penetrates into the gap to establish a bond between the iron-base material and the copper-base pipe material.

These prior art methods, however, suffer from their inherent problems. The first method (1) has the problems that: (i) the use of large amounts of flux in order to achieve improved bonding ability harms the working environment; and (ii) excess copper-base material needs to be cast, which leads to poor yield, considerable amounts of processing in the post treatment subsequent to casting, and consequently, high cost.

The following problems have been encountered by the second and third methods (2), (3). (i) Unless the diameter and surface roughness of the bore of the iron-base material and the outside diameter and surface roughness of the copper-base pipe material are adjusted with high precision, bonding rate will vary to a considerable extent and the percentage of defective products will increase. Supervision for ensuring such absolute precision incurs additional cost. (ii) Materials that can be used for forming the copper-base pipe material are limited and the production of the copper-base pipe material is expensive.

Another known technique is sinter-joining in which a tubular copper-base material is forced into the bore of a tubular iron-base material and the materials are wholly heated and joined to each other to produce an integral body. In this method, a means such as a jig is used for pressurizing the copper-base material in its expanding direction from inside in order to prevent defective joining due to the shrinkage of the copper-base material. However, it is difficult to ensure high bonding quality with this method because of the difficulty in uniform pressure transmission.

The invention has been made for the purpose of overcoming the foregoing problems and one of the objects of the invention is therefore to provide a sinter-joining method capable of achieving high bonding quality in joining a copper-base material to an iron-base material by sintering without incurring additional cost. Another object of the invention is to provide a sintered composite member produced by this method.

DISCLOSURE OF THE INVENTION

The first object can be accomplished by a sinter-joining method for joining a copper-base material to an iron-base material according to the invention, the method comprising the steps of:

(a) heating the copper-base material, which is composed of at least three components including one or more metals and/or semi-metallic elements which have ability to give expansibility, in contact with the iron-base material at temperatures equal to and higher than 600° C. for a specified time so that the copper-base material expands and joins to the iron-base material, and (b) further heating the copper-base and iron-base materials at temperatures equal to and higher than 800° C. to increase the compactness of the copper-base material.

According to the invention, the copper-base material can be firmly joined to the iron-base material by heating them for a specified time at temperatures equal to and higher than 600° C. at which the expanding behavior of the copper-base material is observed. Therefore, when compacting of the copper-base material is promoted by sintering at temperatures equal to and higher than 800° C. in the subsequent step, the copper-base material does not shift off the surface of the iron-base material nor separate from the iron-base material, so that excellent bonding quality can be ensured. In the sinter-joining method according to the invention, joining of the copper-base material to the iron-base material involves only temperature control and therefore no special cost is incurred.

According to the sinter-joining method of the invention, the iron-base material is a tubular iron-base member and the copper-base material is a tubular copper-base member having an outside diameter that is substantially equal to or slightly smaller than the diameter of the bore of the tubular iron-base member. The tubular iron-base member and the tubular copper-base member are heated at temperatures equal to and higher than 600° C. as set forth earlier, while the latter being inserted in the bore of the former. With this arrangement, the tubular copper-base member can be joined to the inside of the tubular iron-base member.

In the sinter-joining method of the invention, the copper-base material contains a Cu—Sn component and a metal and/or semi-metallic element which stabilizes the β phase of the Cu—Sn alloy or a phase similar to the β phase of the Cu—Sn alloy, as an element for promoting expansibility. The addition of such an element enhances the expanding behavior of the copper-base material, which establishes a stronger bond between the copier-base material and the iron-base material. The element for stabilizing the β phase or a phase similar to the β phase may be one or more elements selected from the group consisting of Al, Si, Ga, Be, In, Sb, Zn, Ti, Zr, Fe, Ni, Mn, Cr, and Co.

It is desirable to add an element which inhibits the stabilizing function of the element for stabilizing the β phase or a phase similar to the β phase. The purpose for adding such element is to encourage compacting of the copper-base material when the behavior of the copper-base material is transited from expanding state to the contracting state by heating the copper-base material to temperatures equal to and higher than 800° C. The element for inhibiting the stabilizing function may be one or more elements selected from the group consisting of Ti, Pb, Zn, P, Sb, Ag, and In, Ni, Co, Mn, Fe and Cr.

The second object can be accomplished by a sintered composite member produced by joining the copper-base material to the iron-base material by sintering with the above-described sinter-joining method according to the invention.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BEST MODE FOR CARRYING OUT THE INVENTION

Referring now to the accompanying drawings, the sinter-joining method and sintered composite member of the invention will be hereinafter explained.

First Embodiment

Figure 1:
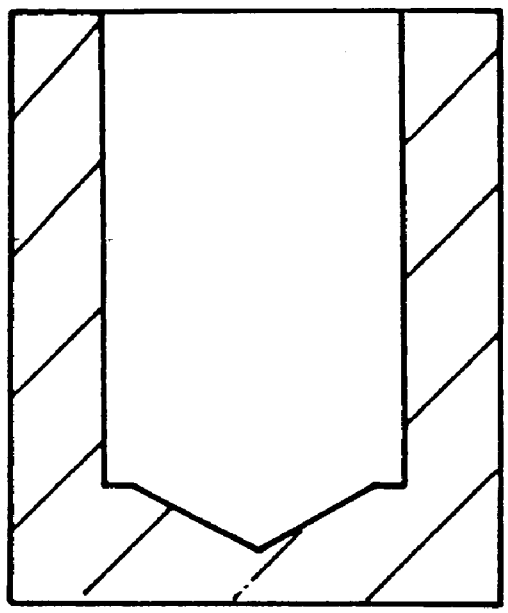
FIGS. 1(a) and 1(b) are cross sectional views of joining members according to the invention.
Figure 1:
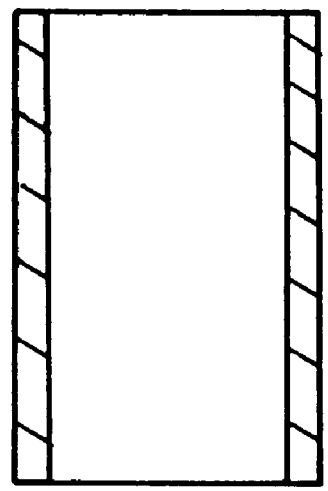

Cu20Sn, Sn atomized powder, TiH, Pb atomized powder, Cu8P, graphite, phosphor iron (27% P), $SiO_2$, $Al_2O_3$, $ZrO_2$, $Si_3N_4$ and SiC were added singly or in combination in the weight percentages as enumerated in Table 1 to an electrolytic Cu powder to prepare copper-containing powder mixtures. A pressure of 4 t/cm$^2$ was applied to each powder mixture thereby to form a thin-walled tubular compact body (i.e., tubular copper-base member) as shown in FIG. 1(a) which had an outside diameter of 25.0 (+0.0, −0.05)mm, inside diameter of 20 mm and height of 20.0 mm. Bottom-closed (blind bored) tubular bodies (i.e., tubular iron-base members) each having an outside diameter of 25.0(+0.2, −0.0)mm and depth of 25 mm as shown in FIG. 1(b) were made from SCM440H steel. The thin-walled tubular compact body made from each powder mixture was forced into the blind bore of each bottom-closed tubular body. These combined bodies were heated in an atmosphere (dew point=−50° C. or less) of ammonia cracked gas, while elevating temperature at a rate of 5° C./minute. The bodies were kept at sintering temperature for 15 minutes and then cooled with a temperature dropping rate of 30° C./minute or more thereby to prepare a sintered composite member corresponding to each powder mixture.

TABLE 1

| | Cu20Sn | SnAt | TiH | Pb | Cu8P | C(Gr) | Fe27P | SiO$_2$ | Al$_2$O$_3$ | ZrO$_2$ |
|---|---|---|---|---|---|---|---|---|---|---|
| 1 | 0 | 0 | 6.0 | 0 | | | | | | |
| 2 | 0 | 0 | 10.0 | 0 | | | | | | |
| 3 | 0 | 0 | 6.0 | 5.0 | | | | | | |
| 4 | 0 | 0 | 10.0 | 10.0 | | | | | | |
| 5 | 10 | 0 | 6.0 | 5.0 | | | | | | |
| 6 | 10 | 2.0 | 6.0 | 5.0 | | | | | | |
| 7 | 25 | 5.0 | 0 | 5.0 | | | | | | |
| 8 | 25 | 5.0 | 0.5 | 5.0 | | | | | | |
| 9 | 25 | 5.0 | 1.0 | 5.0 | | | | | | |
| 10 | 25 | 5.0 | 2.0 | 5.0 | | | | | | |
| 11 | 25 | 5.0 | 3.0 | 5.0 | | | | | | |
| 12 | 25 | 5.0 | 1.0 | 5.0 | 6.5 | | | | | |
| 13 | 25 | 5.0 | | 5.0 | | 1.0 | | | | |
| 14 | 25 | 5.0 | 2.0 | 5.0 | | 0.2 | | | | |
| 15 | 25 | 5.0 | 0.5 | 5.0 | | 0.5 | | | | |
| 16 | 25 | 5.0 | 2.0 | 5.0 | | 1.9 | | | | |
| 17 | 25 | 5.0 | | 5.0 | | | 1.0 | | | |
| 18 | 25 | 5.0 | | 5.0 | | | 5.0 | | | |
| 19 | 25 | 5.0 | 0.5 | 5.0 | | | 1.0 | | | |
| 20 | 25 | 5.0 | | 5.0 | | | | 1.5 | | |
| 21 | 25 | 5.0 | 0.5 | 5.0 | | | | 0.5 | | |
| 22 | 25 | 5.0 | 0.5 | 5.0 | | | | 1.5 | | |
| 23 | 25 | 5.0 | | 5.0 | | | | | 1.0 | |
| 24 | 25 | 5.0 | 0.5 | 5.0 | | | | | 1.0 | |
| 25 | 25 | 5.0 | | 5.0 | | | | | | 1.0 |
| 26 | 25 | 5.0 | 0.5 | 5.0 | | | | | | 1.0 |
| 27 | 25 | 5.0 | 0.5 | 15.0 | | | | | | |

[Expansion/contraction resulted from a single addition of TiH and the lower limit amount of TiH]

Figure 2:
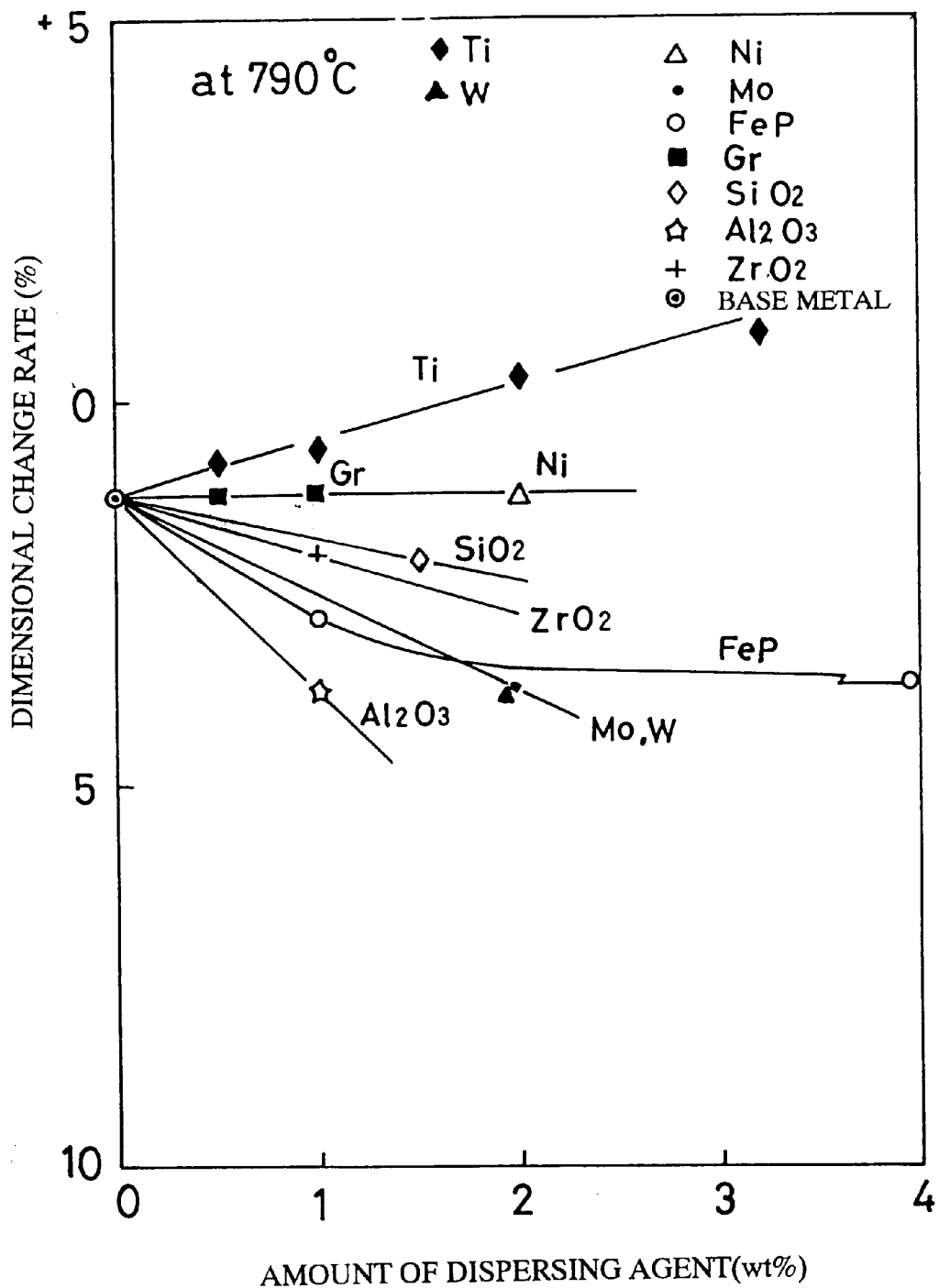
FIG. 2 is a graphical representation of the expanding/contracting behavior of samples according to a first embodiment of the invention.
Figure 3:
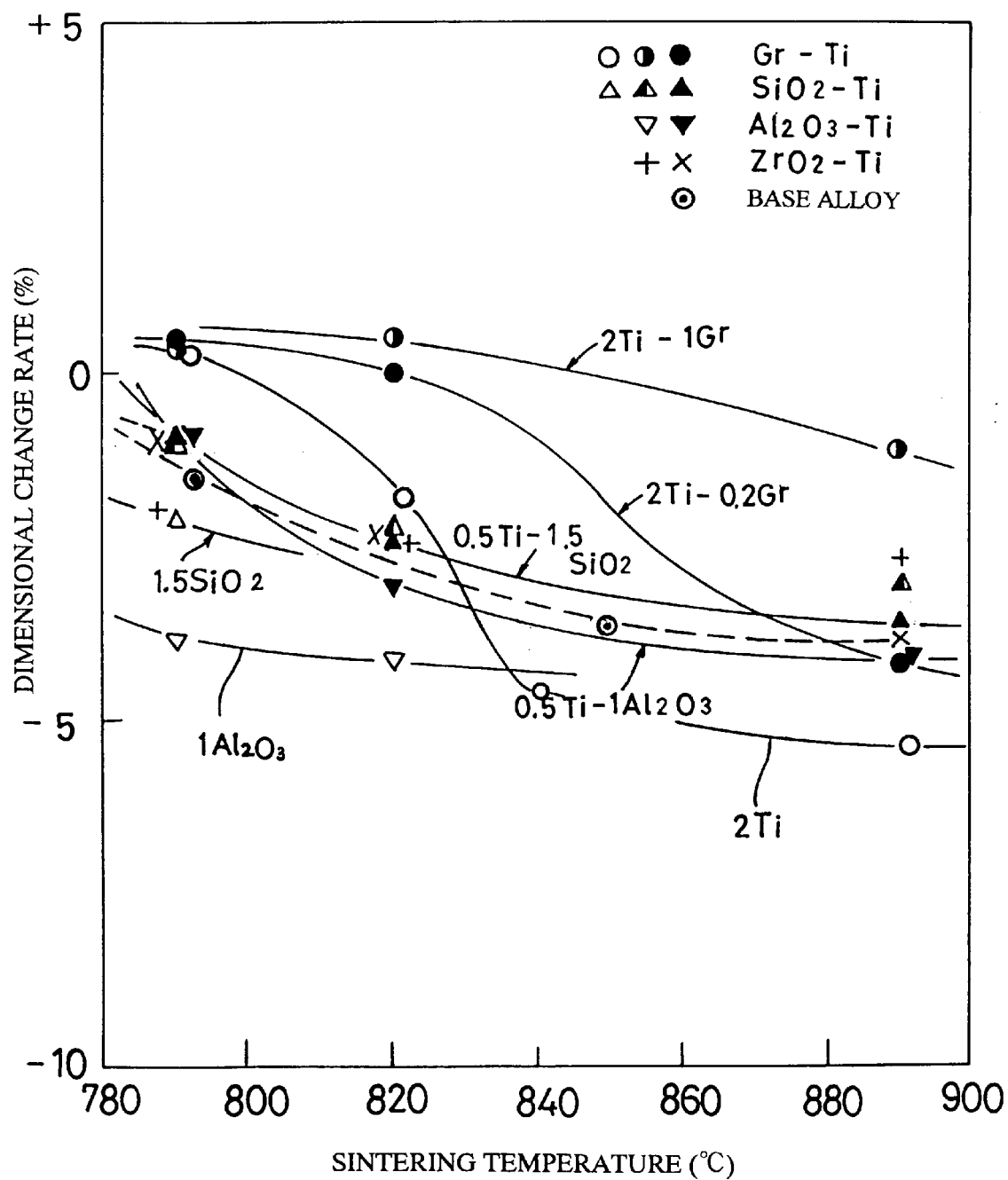
FIG. 3 is a graphical representation of the expanding/contracting behavior of samples according to the first embodiment.

The additives shown in FIGS. 2 and 3 were added singly or in combination to a base powder material containing 25 wt % of Cu20Sn, 5 wt % of Sn atomized powder, 5 wt % of Pb atomized powder and the remaining part of electrolytic Cu powder (CE15) to prepare powder mixtures. Each powder mixture was formed into a thin-walled tubular compact body which was the same as described previously and each thin-walled tubular compact body was heated with temperature being elevated from 790° C. to measure its dimensional change rate. The results are shown in FIGS. 2 and 3. In the graph of FIG. 2, the amount (wt %) of each additive used is plotted on the abscissa and the dimensional change rate (%) is plotted on the ordinate. In the graph of FIG. 3, "Gr" represents graphite, and "2Ti—1Gr", for example, means that 2 wt % of Ti and 1 wt % of graphite were added.

It is understood from FIG. 2 that when TiH was added alone, the expansion of the thin-walled tubular compact body was significant in the low temperature region (e.g., 790° C.) so that the thin-walled tubular compact body was pressure joined to the surface of the bore of the bottom-closed tubular body, due to its self-expansion. It is understood from FIG. 3 that the thin-walled tubular compact body formed from the powder mixture containing TiH alone as an additive was significantly contracted by sintering and the sinter had good compactness in the high temperature region (e.g., 820° C.).

Of the powder mixtures, the powder mixture containing 0.5 wt % of TiH allowed the thin-walled tubular compact body to be fitted in the bottom-closed tubular body with substantially no clearance therebetween so that a good joining condition was achieved.

[The upper limit amount of TiH and the lower limit amount of Sn, the effect of the coexistence of Pb and Sn]

Figure 4:
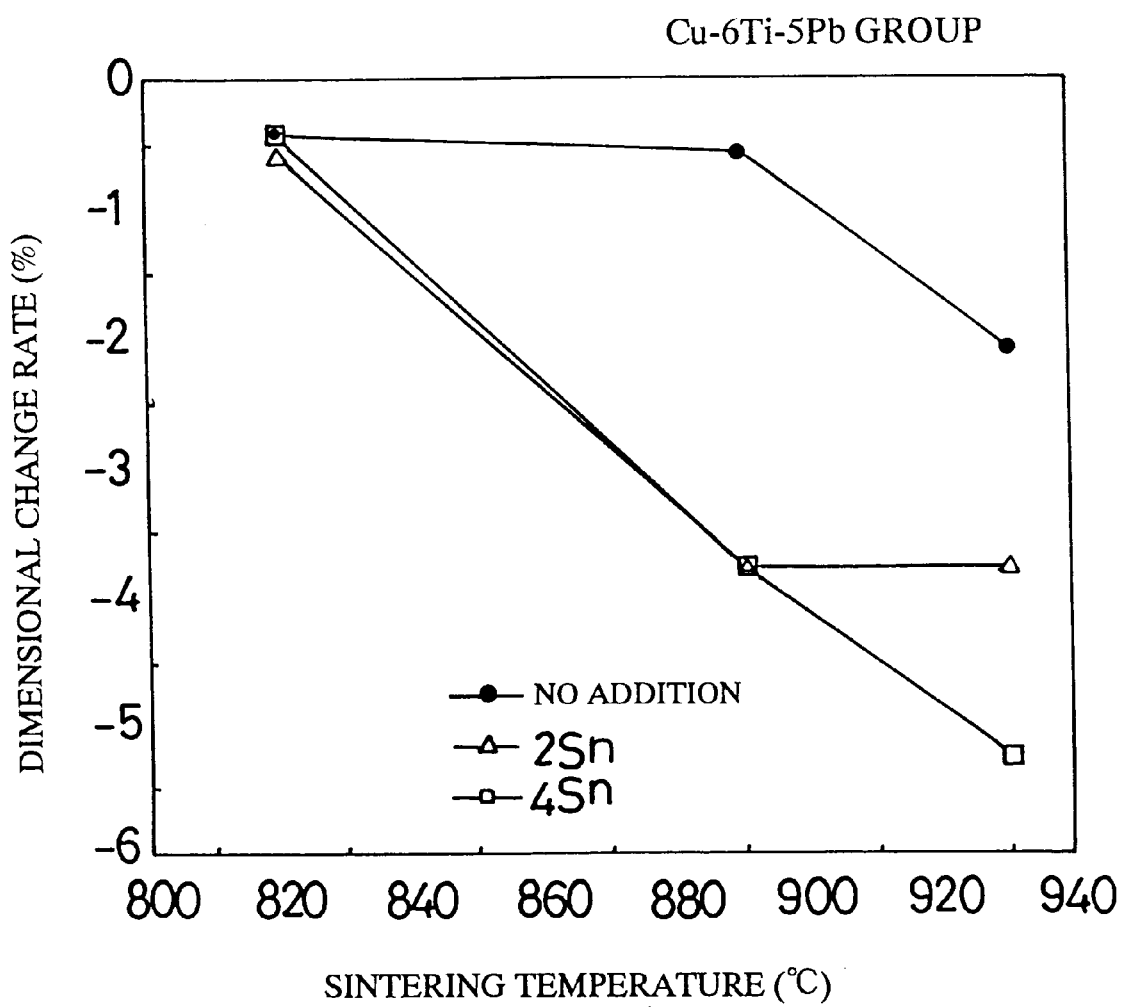
FIG. 4 is a graphical representation of the expanding/contracting behavior of samples according to the first embodiment.

Sn was added in amounts of 0.2 wt % and 4 wt % respectively to a base powder material containing 6 wt % of Ti, 5 wt % of Pb, the remaining part of Cu to prepare powder mixtures which were respectively formed into a thin-walled tubular compact body having the same dimensions as described earlier. The dimensional change rates of the thin-walled tubular compact bodies during sintering ware measured. FIG. 4 shows the results of the measurements. As seen from FIG. 4, in the presence of 4 wt % of Sn, the sinter expanded in the low temperature region and remarkably contracted in the high temperature region. From an economical viewpoint, the upper limit amount of TiH is preferably about 7.0 wt %.

Pb was added in amounts of 0.5 wt % and 10 wt % respectively to a powder material containing 6 wt % of Ti and the remaining part of Cu to prepare powder mixtures for forming a thin-walled tubular compact body. The dimensional change rates of the thin-walled tubular compact bodies during sintering were measured and the results of the measurements are shown in FIG. 5.

Figure 5:
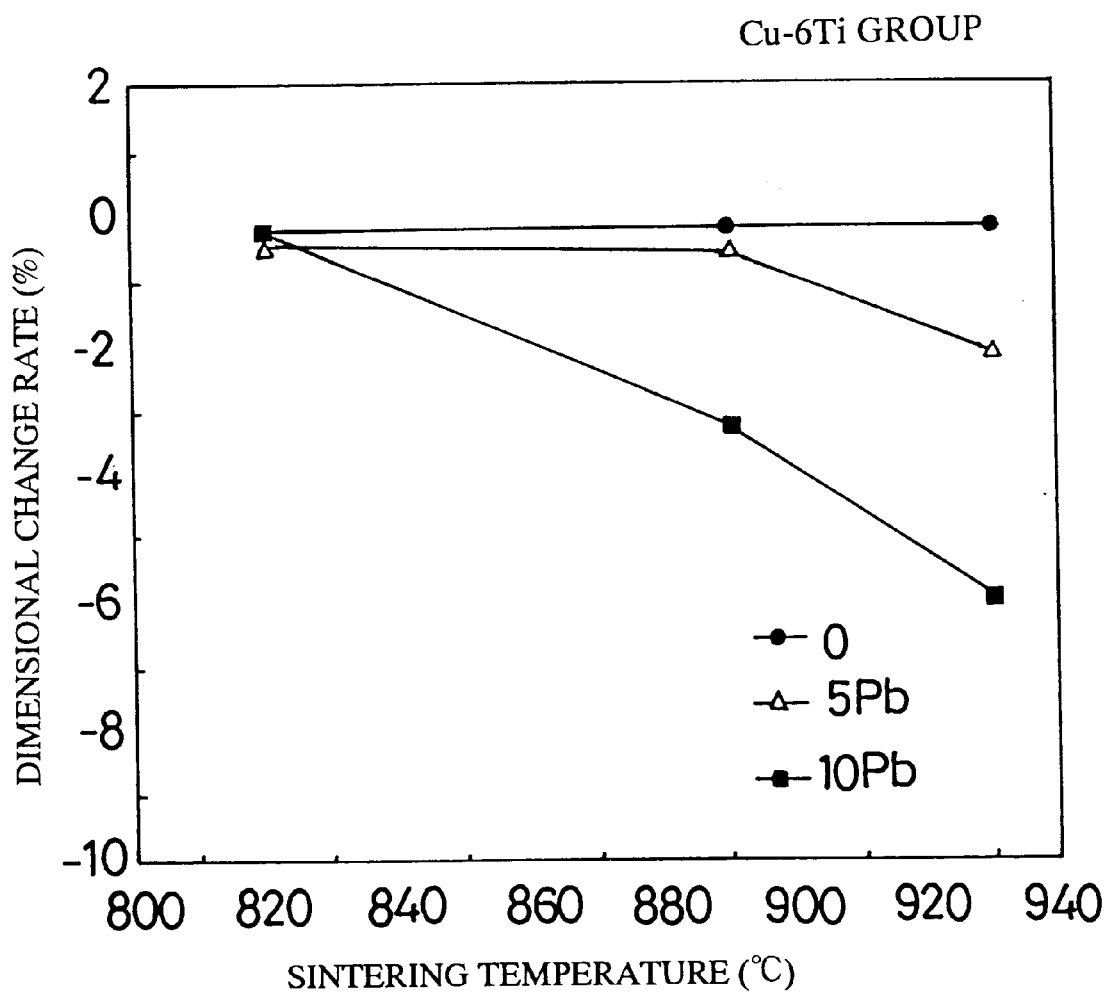
FIG. 5 is a graphical representation of the expanding/contracting behavior of samples according to the first embodiment.

As understood from FIG. 5, the addition of Pb does not only contribute to an improvement in bonding ability but also has the effect of enhancing contraction so that the thin-walled tubular compact body containing 10 wt % of Pb remarkably contracts in the high temperature region in spite of the absence of Sn. However, when taking into account the risk of evaporation of Pb in conjunction with environmental problems, it is desirable to use Sn in combination with Pb thereby restricting the final sintering temperature. Bonding quality can be stabilized simply by adding PB and particularly, the addition of 15 wt % of Pb ensures satisfactory practicability by permitting the thin-walled tubular compact body to have a shearing strength of 7 kg/mm$^2$ or more at its joint surface with the above-described bottom-closed tubular body made from an iron-base material. In view of environmental problems and serviceability, the maximum amount of Pb is about 15 wt %.

[Single addition of graphite and ceramic particle materials and the effect of addition of these materials in combination with TiH]

As seen from FIGS. 2 and 3, in the case of single addition of graphite, virtually no expansion was observed in the low temperature region but it occurred as sintering temperature increases, so that the sinter could not obtain sufficient compactness although it had bonding ability. The reason for this is considered to be that the poor wettability of graphite relative to the Cu—Sn—Pb phase generated during liquid phase sintering adversely affects the expansibility of the sinter. Addition of TiH or Zr together with graphite is therefore considered suitable to improve the wettability of graphite. As Zr works on Cu similarly to Ti, Zr may be used in the invention although the amount of Zr to be added is limitative.

It is understood from FIGS. 2 and 3 that addition of a ceramic particle material such as $SiO_2$, $Al_2O_3$ or $ZrO_2$ alone contributes to the contractibility of the sinter rather than the expansibility of the sinter in the low temperature region. This fact is confirmed particularly by the cases where $Al_2O_3$, Mo (see the Second Embodiment described later) or phosphor iron is added.

Where 0.5 wt % of TiH was added in addition to each kind of ceramic particles (i.e., $SiO_2$, $Al_2O_3$ or $ZrO_2$), the increased contractibility due to the addition of the ceramic particles is restricted while the effect of TiH is enhanced so that the bonding ability of the sinter is increased. This phenomenon is noticeable particularly in the case of $Al_2O_3$ addition. As this phenomenon is common to $Al_2O_3$, $SiO_2$ and $ZrO_2$, it is conceivable that it would be observed in addition of other ordinary ceramic materials.

It was observed that the contraction of the sinter was promoted by single addition of the above material without use of TiH except for the case of Gr and therefore the effect of addition of TiH was proved.

As obvious from the case of single addition of 1 wt % Gr, when Gr was added without TiH, the sinter was not sufficiently densified in the high temperature region. This resulted in unsatisfactory shearing strength which ranged from 3 to 5 kg/mm$^2$. On the other hand, when Gr was added together with 2.0% TiH, a shearing strength of 15 to 20 kg/mm$^2$ could be achieved. As understood from the comparison between these cases, the strength obtained by single addition of Gr is considerably poor. Even when Ti is added to join with cast iron which contains graphite which inhibits a bond between the joining materials, Ti reacts with graphite, forming a compound phase TiC. In view of this fact, the preferable amount of Ti is 0.2 wt % or more, for ensuring stable bonding ability and bonding strength. Insufficient expansion in the low temperature region can be compensated by further addition of Al, Si or Zn (described later). Addition of Ti in an amount of 0.2 wt % or more has the advantage of perfectly preventing foaming during sintering of a Cu—Sn alloy.

[The effect of addition of Cu8P]

When adding P in the form of a Cu—P alloy, P in an amount of 0.1 wt % or more has a remarkable effect because it significantly improves the flowability and wettability of a liquid phase which is generated in a small amount. However, addition of large amounts of P leads to brittleness. Therefore, the maximum amount of P is preferably about 1.0 wt %.

Single addition of Mo or W also leads to significant contraction but when Mo or W is added in combination with TiH, considerable expansibility can be achieved. Therefore, these elements are worth consideration.

Second Embodiment 2

Cu20Sn, Sn atomized powder, TiH, Pb atomized powder, Si stamped powder, Al atomized powder, NiAl stamped powder, Ni$_2$Al$_3$ stamped powder, Fe10Al atomized powder, Cu30Zn atomized powder, carbonyl Ni, carbonyl Co, Mo, W, TiSi stamped powder, Mn stamped powder, and Cr stamped powder were added singly or in combination to prepare copper-containing powder mixtures. Similarly to the first embodiment, a thin-walled tubular compact body (i.e., tubular copper-base member) was made from each powder mixture and bottom-closed tubular bodies (i.e., tubular iron-base members) were made from SCM440H steel. Each thin-walled tubular compact body was forced into each bottom-closed tubular body and then these bodies were sintered in the same way as described in the first embodiment to form sintered composite members corresponding to the respective powder mixtures.

TABLE 2

|   | Cu20Sn | SnAt | TiH | Pb | Si | Al | Ni | Co | Mo | W | NiAl | Ni$_2$Al$_3$ | Fe10Al |
|---|---|---|---|---|---|---|---|---|---|---|---|---|---|
| 1 | 25 | 5.0 | 0.5 | 5.0 | | | | | | | | | |
| 2 | 25 | 5.0 | 1.0 | 5.0 | | | | | | | | | |
| 3 | 25 | 5.0 | 2.0 | 5.0 | | | | | | | | | |
| 4 | 25 | 5.0 | 3.0 | 5.0 | | | | | | | | | |
| 5 | 25 | 5.0 | | 5.0 | 1.0 | | | | | | | | |
| 6 | 25 | 5.0 | | 5.0 | | 0.5 | | | | | | | |
| 7 | 25 | 5.0 | | 5.0 | | | 2.0 | | | | | | |
| 8 | 25 | 5.0 | | 5.0 | | | | 2.0 | | | | | |
| 9 | 25 | 5.0 | | 5.0 | | | | | 2.0 | | | | |
| 10 | 25 | 5.0 | | 5.0 | | | | | | 2.0 | | | |
| 11 | 25 | 5.0 | | 5.0 | | | | | | | 1.0 | | |
| 12 | 25 | 5.0 | | 5.0 | | | | | | | 3.0 | | |
| 13 | 25 | 5.0 | | 5.0 | | | | | | | | 3.0 | |
| 14 | 25 | 5.0 | | 5.0 | | | | | | | | | 3.0 |

Figure 6:
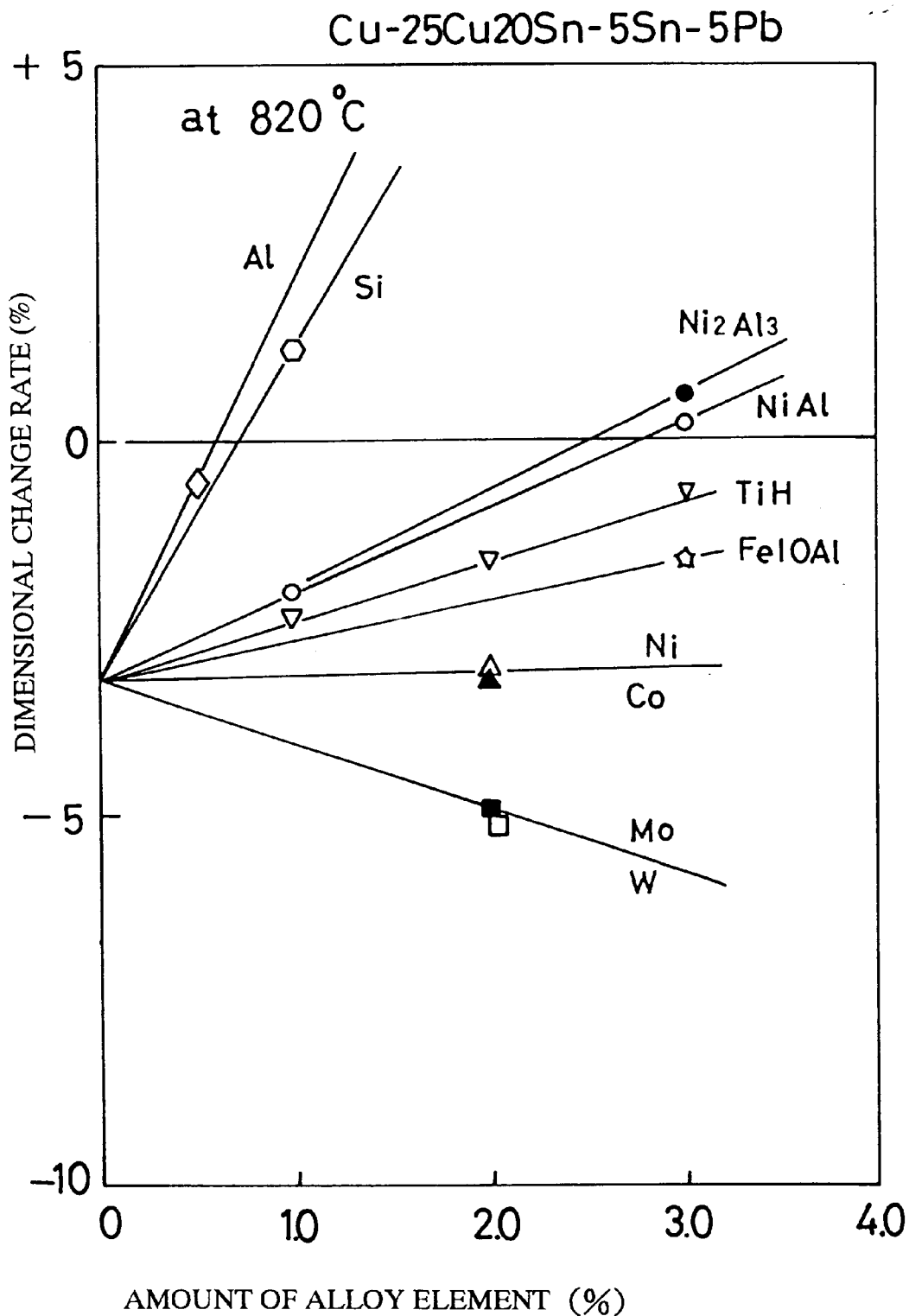
FIG. 6 is a graphical representation of the expanding/contracting behavior of samples according to a second embodiment of the invention.
Figure 7:
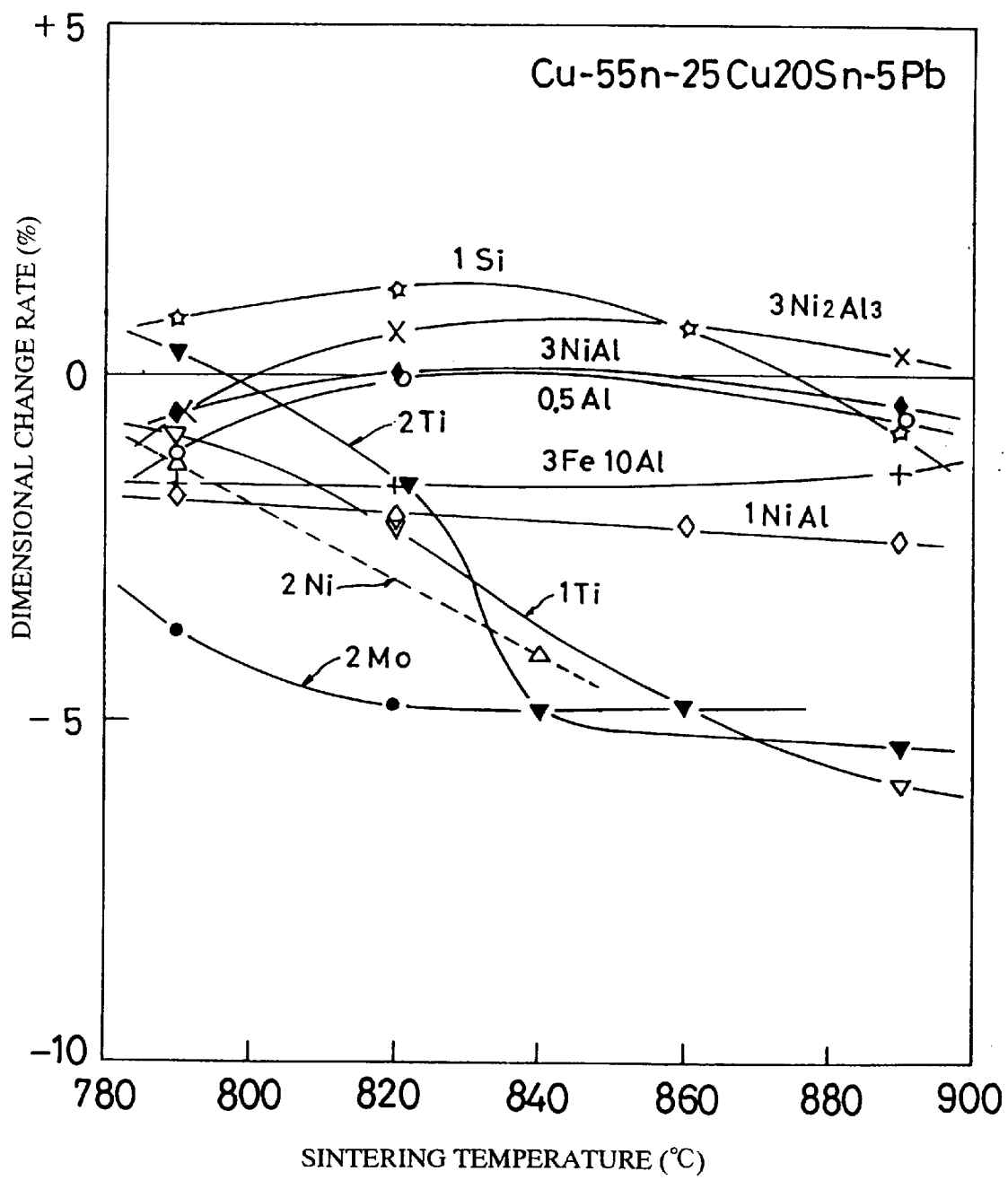
FIG. 7 is a graphical representation of the expanding/contracting behavior of samples according to the second embodiment.

In order to check the effect of each of the above additives, the dimensional change rate of the thin-walled tubular compact body made from each powder mixture was measured when sintered at 820° C. The results of the measurements are shown in FIGS. 6 and 7. As seen from these figures, expanding behavior was observed in the sinter made from the powder mixture containing Si, Al, TiH or an intermetallic compound containing Si, Al or TiH. It is also understood that Mo and W have the effect of enhancing contractibility and therefore the degree of sintering, like the ceramic particle materials disclosed in the first embodiment, while Ni and Co do not give virtually no effect on the dimensional change rate.

It is understood from FIG. 7 that single addition of Si, Al or an intermetallic compound containing Si or Al do not achieve significant contractibility with the progress of sintering in the high temperature region, so that single addition of these elements and intermetallic compounds cannot ensure the desired characteristics. TiH achieves expansion in the low temperature region and contraction in the high temperature region so that it ensures the desired characteristics required in the invention. The amounts of expansion and contraction can be controlled by controlling the amounts of these additives or by adding Al or Si in the form of a master alloy or compound (see FIGS. 6 and 7).

The reason why Si or Al exerts expansibility is considered to be that they stabilize the β phase of the Cu—Sn materials. This conforms to the fact that the peritectic temperatures of the Cu—Si materials and Cu—Al materials are observed in the higher temperature region according to the constitution diagram. It is also conceivable that TiH achieves expansibility because of its ability for stabilizing the β phase of the Cu—Sn materials.

[The effect of combinational addition of TiH—Al and that of TiH—Si]

Figure 8:
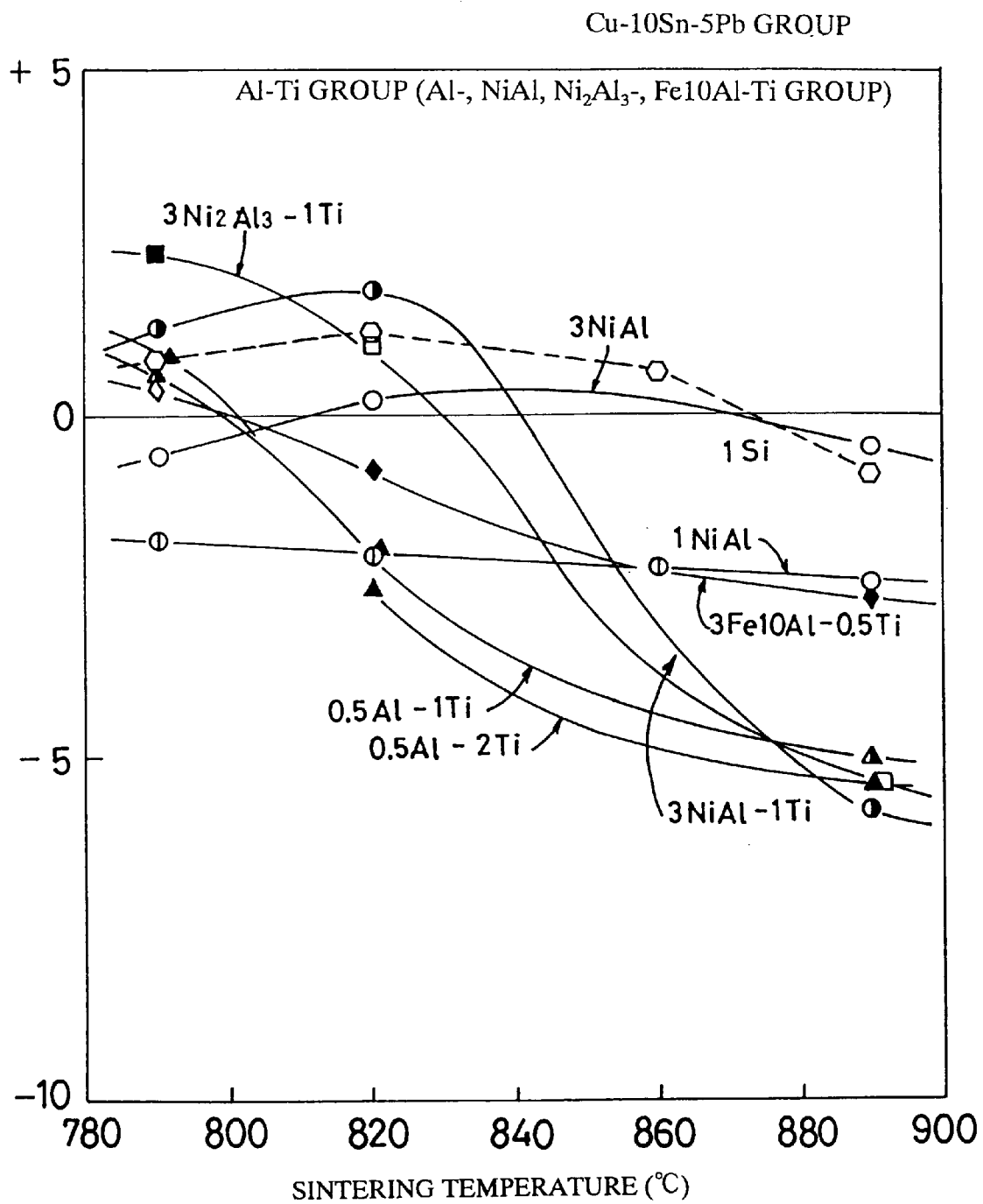
FIG. 8 is a graphical representation of the expanding/contracting behavior of samples according to the second embodiment.
Figure 9:
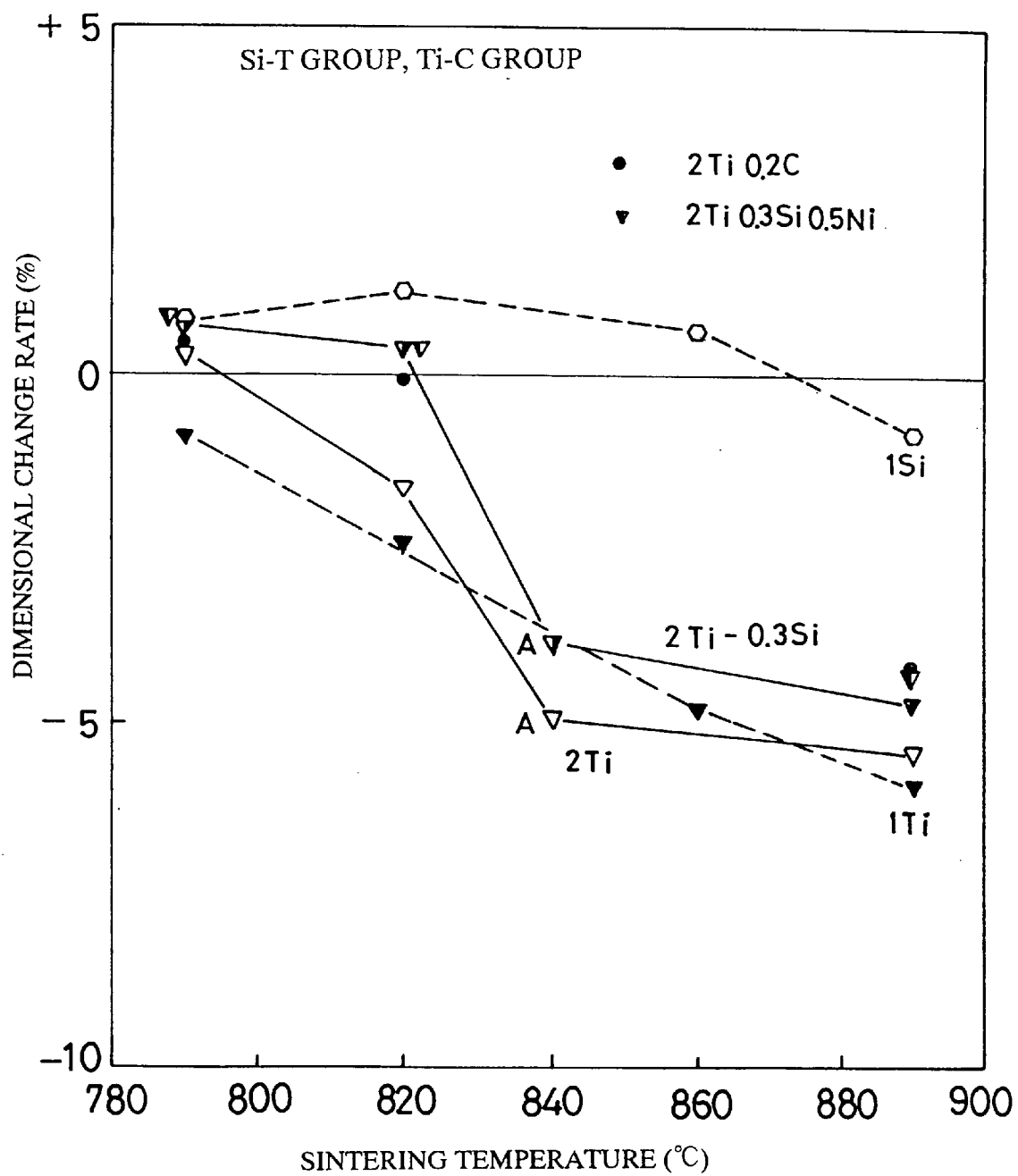
FIG. 9 is a graphical representation of the expanding/contracting behavior of samples according to the second embodiment.
Figure 10:
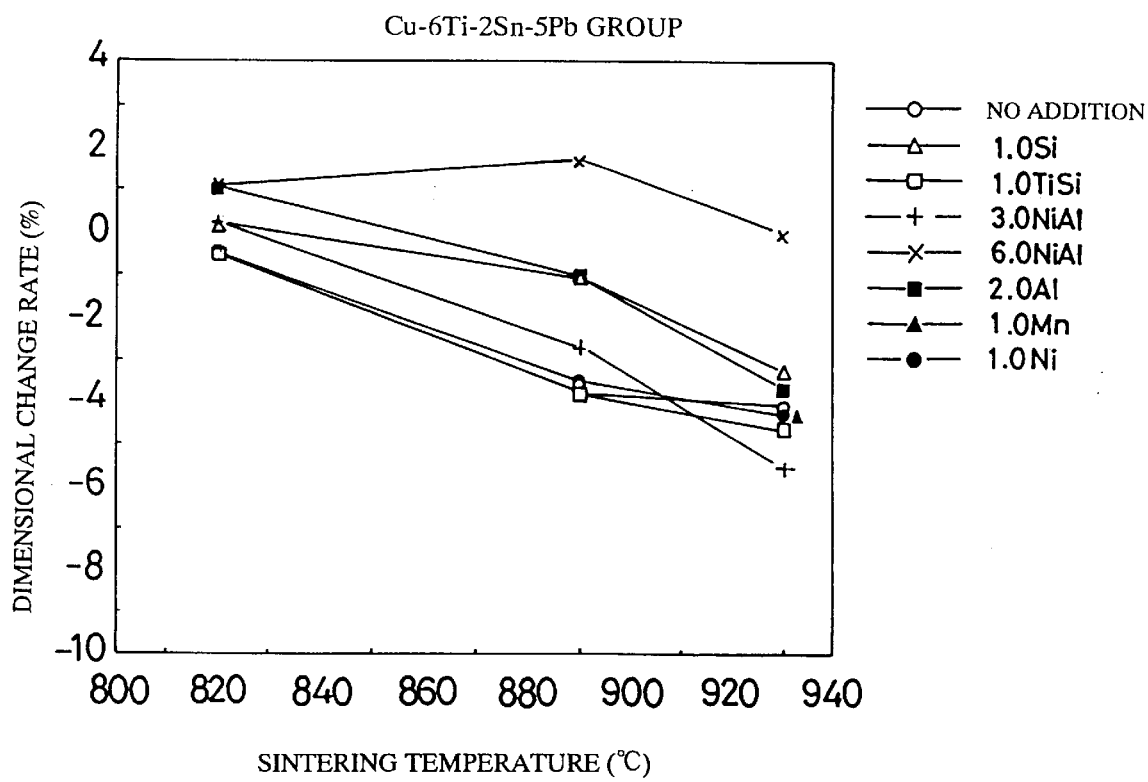
FIG. 10 is a graphical representation of the expanding/contracting behavior of samples according to the second embodiment.

Al or Si were respectively added in combination with TiH to prepare mixture materials. The weight percentages of the elements in each composition are enumerated in Table 3. The dimensional change rate of a sinter produced from each mixture material was measured. FIGS. 8, 9 and 10 show the results of the measurements.

traction in the high temperature region and makes it difficult to achieve the desired compactness.

[The effect of addition of pure Al and the aim of addition of compounds]

When adding Al in the form of pure metal powder, Al is more likely to be affected by the sintering atmosphere (i.e., more liable to oxidation), causing excessive expansion in the low temperature region and making it difficult to achieve densification in the high temperature region. Therefore, it is conceivable to add Al in the form of a thermally stable intermetallic compound such as NiAl or FeAl. According to this concept, the effect obtained by high-melting-point intermetallic compounds such as Ni—Al compounds and Fe—Al compounds can be also expected by intermetallic compounds such as Cu—Al, Mn—Al, Co—Al and Cr—Al which are close to Ni group and Fe group. Therefore, addition of such an intermetallic compound conforms to the principle of the invention. When using an Al intermetallic compound, the amount of Al added is obtained by calculating the Al content of the intermetallic compound. The amount of Ni, Fe, Co, Cr or Mn contained in the intermetallic compound used should be within the specified range for the invention.

When adding Al or Si in combination with TiH, it is desirable to add them in the form of a master alloy powder containing Ti—Al or Ti—Si.

TABLE 3

|   | Cu20Sn | SnAt | TiH | Al  | NiAl | Ni$_2$Al$_3$ | Fe10Al | Si  | TiSi | Mn  | Ni  | Pb  |
|---|--------|------|-----|-----|------|--------------|--------|-----|------|-----|-----|-----|
| 1 | 25     | 5.0  | 1.0 | 0.5 |      |              |        |     |      |     |     | 5.0 |
| 2 | 25     | 5.0  | 2.0 | 0.5 |      |              |        |     |      |     |     | 5.0 |
| 3 | 25     | 5.0  | 1.0 |     | 3.0  |              |        |     |      |     |     | 5.0 |
| 4 | 25     | 5.0  | 1.0 |     |      | 3.0          |        |     |      |     |     | 5.0 |
| 5 | 25     | 5.0  | 1.0 |     |      |              | 3.0    |     |      |     |     | 5.0 |
| 6 | 25     | 5.0  | 2.0 |     |      |              |        | 0.3 |      |     |     | 5.0 |
| 7 | 25     | 5.0  | 2.0 |     |      |              |        | 0.3 |      |     | 0.5 | 5.0 |
| 8 | 10     | 0    | 6.0 | 2.0 |      |              |        |     |      |     |     | 5.0 |
| 9 | 10     | 0    | 6.0 |     | 3.0  |              |        |     |      |     |     | 5.0 |
| 10| 10     | 0    | 6.0 |     | 6.0  |              |        |     |      |     |     | 5.0 |
| 11| 10     | 0    | 6.0 |     |      |              |        | 1.0 |      |     |     | 5.0 |
| 12| 10     | 0    | 6.0 |     |      |              |        |     | 1.0  |     |     | 5.0 |
| 13| 10     | 0    | 6.0 |     |      |              |        |     |      | 1.0 |     | 5.0 |
| 14| 10     | 0    | 6.0 |     |      |              |        |     |      |     | 1.0 | 5.0 |

It is understood from the examples of Al addition (see FIG. 8), when Al in the form of an intermetallic compound was added in combination with TiH, the expansibility of the sinter in the low temperature region was significant. This allows a large clearance between the bore of the bottom-closed tubular body and the outside diameter of the thin-walled tubular compact body, which leads to less strict process control in the production line and a loose tolerance in dimensioning the diameter of the bore. Consequently, cost reduction and improved bonding quality can be achieved.

The preferable lower limit amount of Ti is about 0.2 wt %. The reason for this is that the effect of Ti can be enhanced by controlling the amount of Si, Al or an intermetallic compound containing Si or Al. This is obvious from the case where 3 wt % of Fe10Al alloy and 0.5 wt % of TiH are added in combination. In this case, the behavior of the sinter changes from expansion in the low temperature region to significant contraction in the high temperature region.

The preferable lower limit amount of Si and that of Al are 0.1 wt % respectively, for the reason that the desired effects of addition of Si, Al or an intermetallic compound containing Si or Al can be obtained with this amount or more. Their preferable upper limit amounts are 3.0 wt %, because the occurrence of excessive expansion requires excessive con-

[The lower limit amount of Sn and the function of Pb]

FIGS. 7 and 8 show the effect of addition of Sn and Pb to Cu—6Ti. In consideration of the effect, the lower limit amount of Sn is about 2 wt %. Addition of 10 wt % of Pb ensures contraction in the high temperature region but about 2 wt % of Sn is necessary when taking into account the bonding ability of the copper-base material relative to iron (the expansibility of Si and Al). FIG. 10 shows the effects of addition of various alloy elements to the base material containing Sn in an amount corresponding to its lower limit and Ti in an amount substantially corresponding to its upper limit. As seen from this figure, the effects of addition of Si, Al or an intermetallic compound containing Si or Al conforms to the principle of the invention.

[The effect of Ni]

Figure 11:
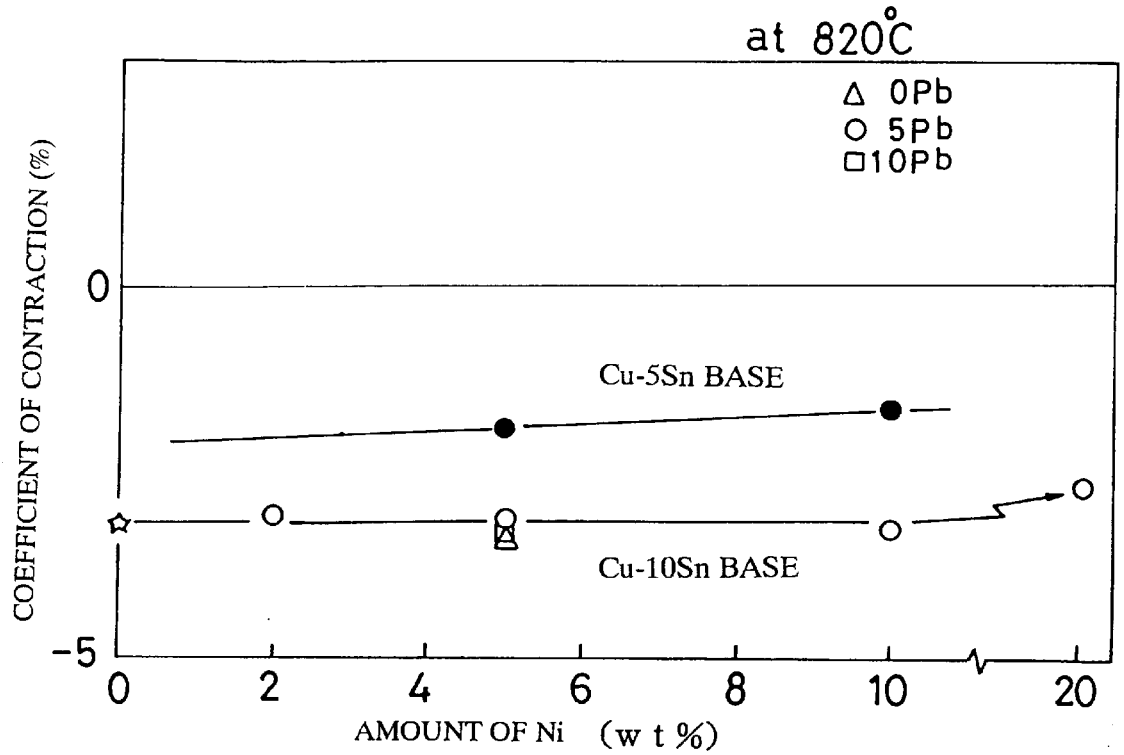
FIG. 11 is a graphical representation of the expanding/contracting behavior of samples according to the second embodiment.
Figure 11:
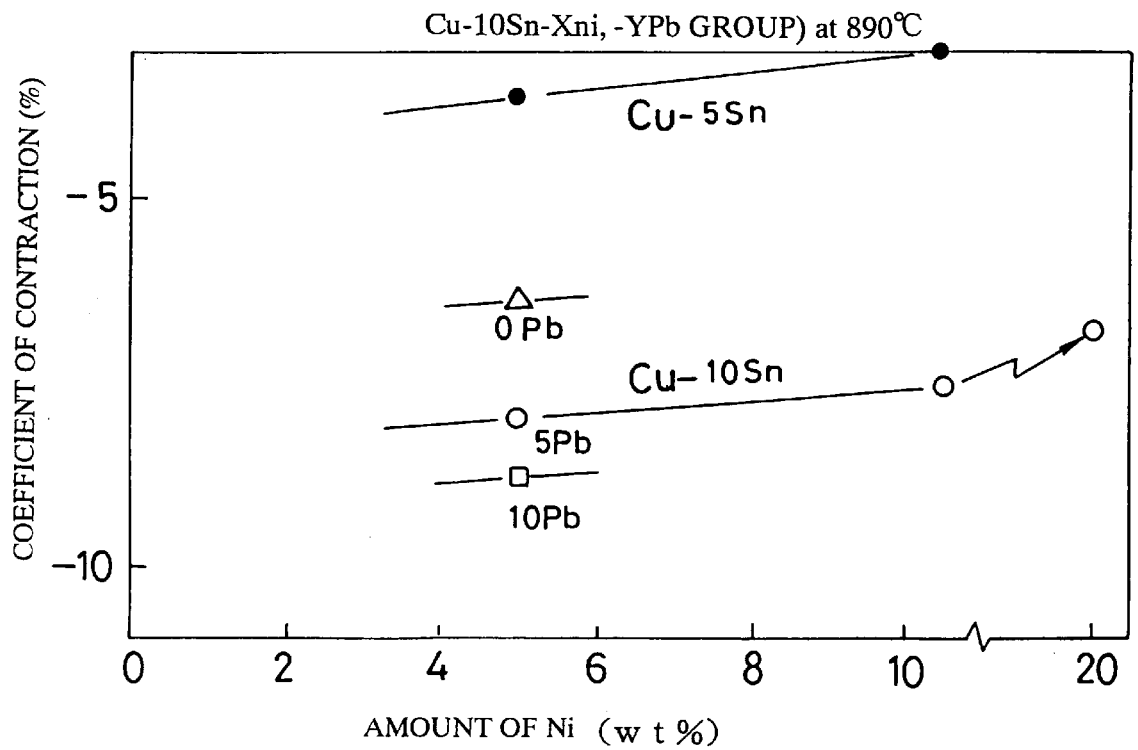
Figure 12:
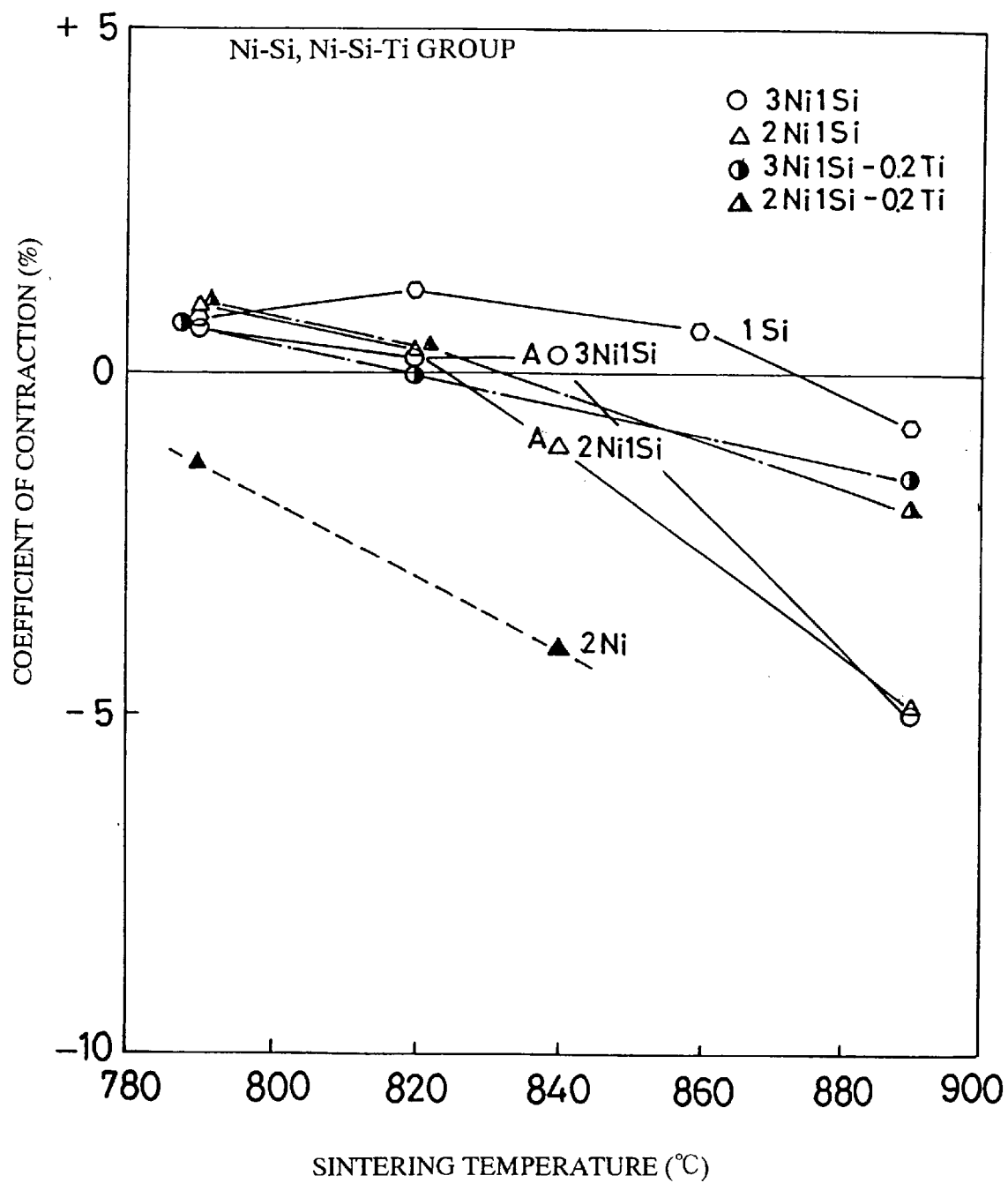
FIG. 12 is a graphical representation of the expanding/contracting behavior of samples according to the second embodiment.

The coefficients of contraction of the sinters were measured in the same way as described above, while the amount of Ni being varied. FIG. 11 shows the results of the measurements. It is understood from FIGS. 11 and 6 that single addition of Ni or Co gives virtually no effects on the expansibility.

The coefficients of contraction of the sinters formed by adding the additives in other examples were measured in the same way as described earlier. FIGS. 12, 13, 14 and 15 show the results of the measurements. As seen from these graphs, when adding Ni in combination with Si, the expanding characteristics of Si is prevailing in the low temperature region and densification is significant in the high temperature region.

Figure 13:
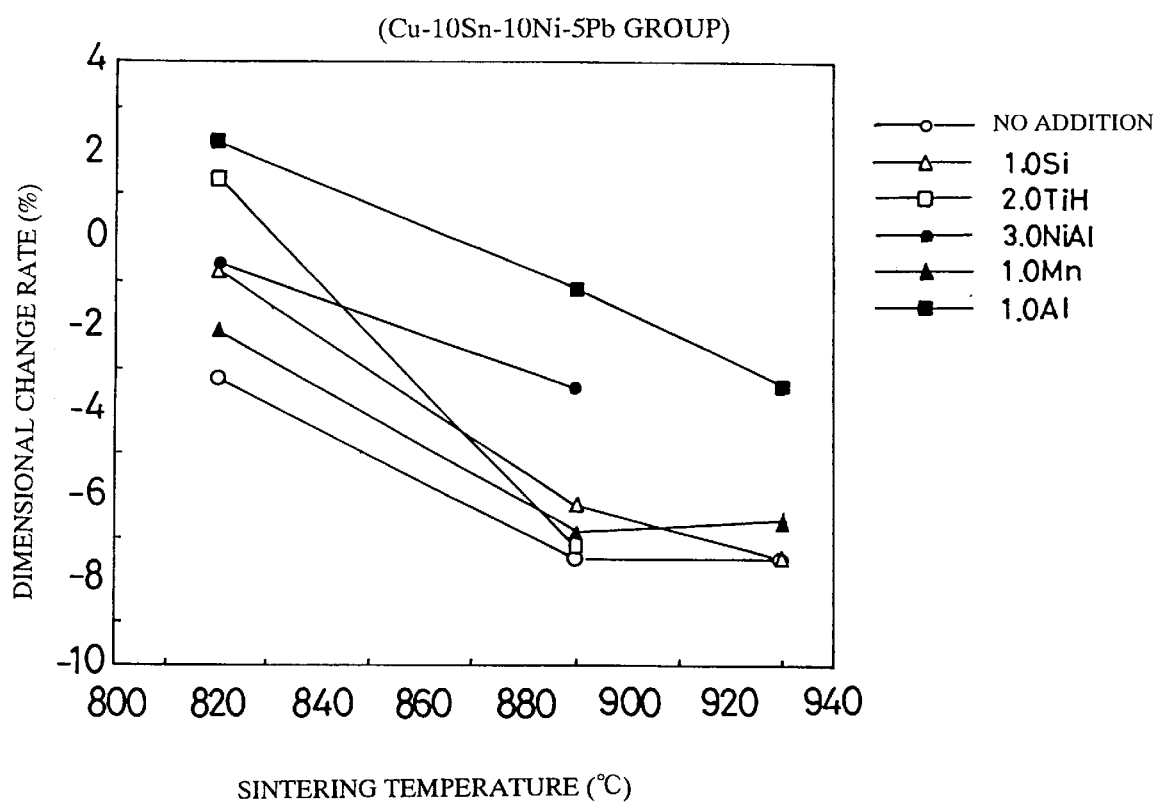
FIG. 13 is a graphical representation of the expanding/contracting behavior of samples according to the second embodiment.
Figure 14:
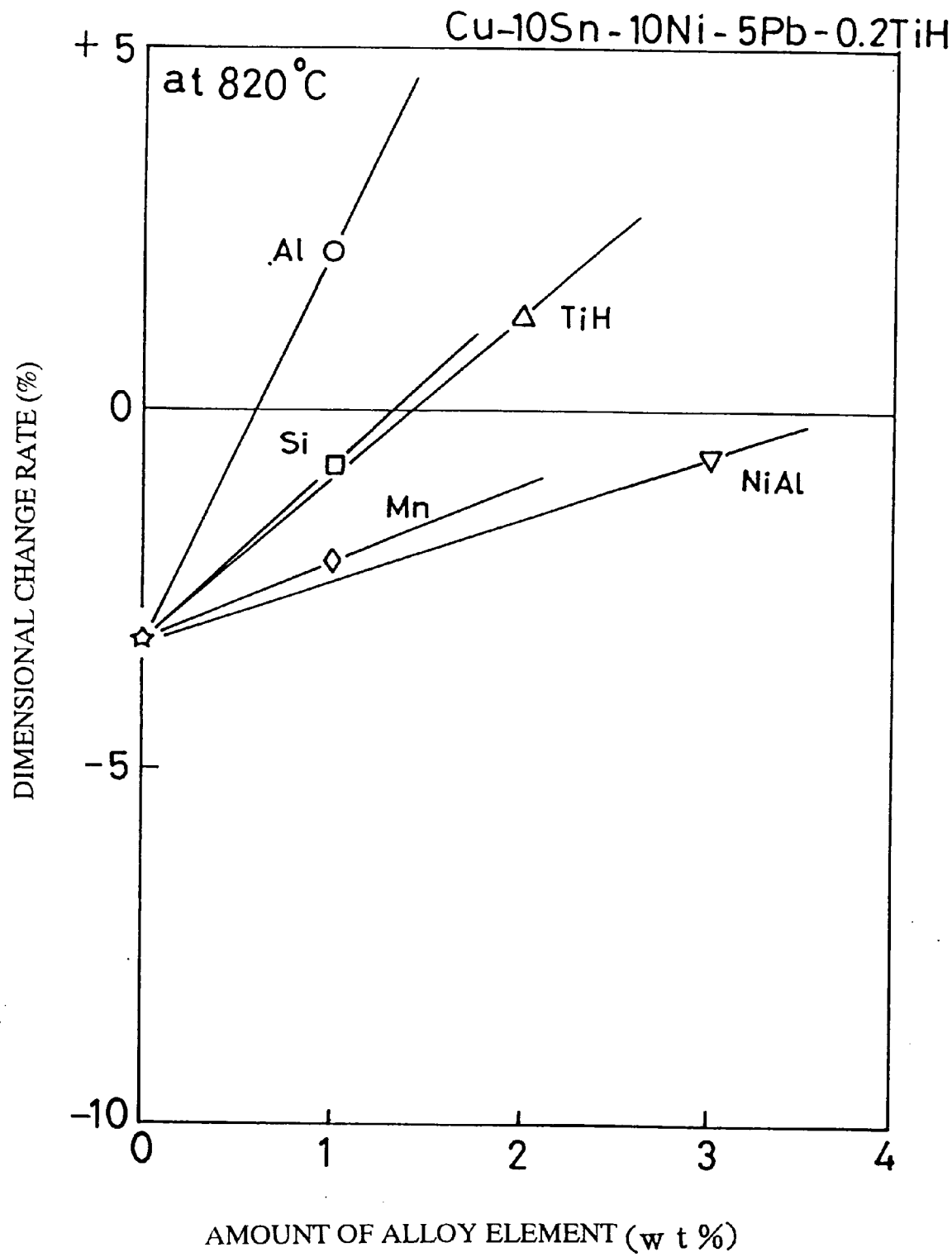
FIG. 14 is a graphical representation of the expanding/contracting behavior of samples according to the second embodiment.
Figure 15:
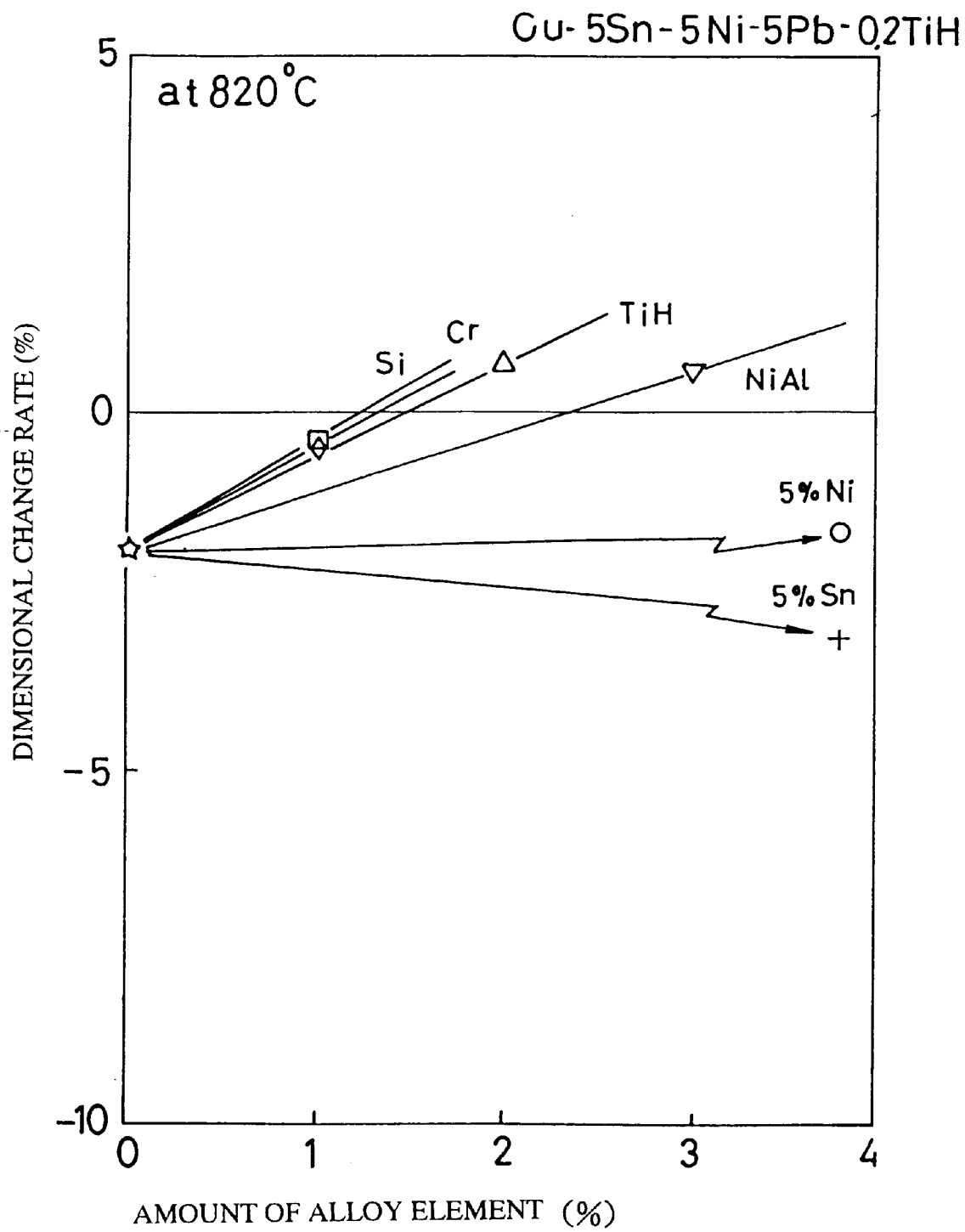
FIG. 15 is a graphical representation of the expanding/contracting behavior of samples according to the second embodiment.
Figure 16:
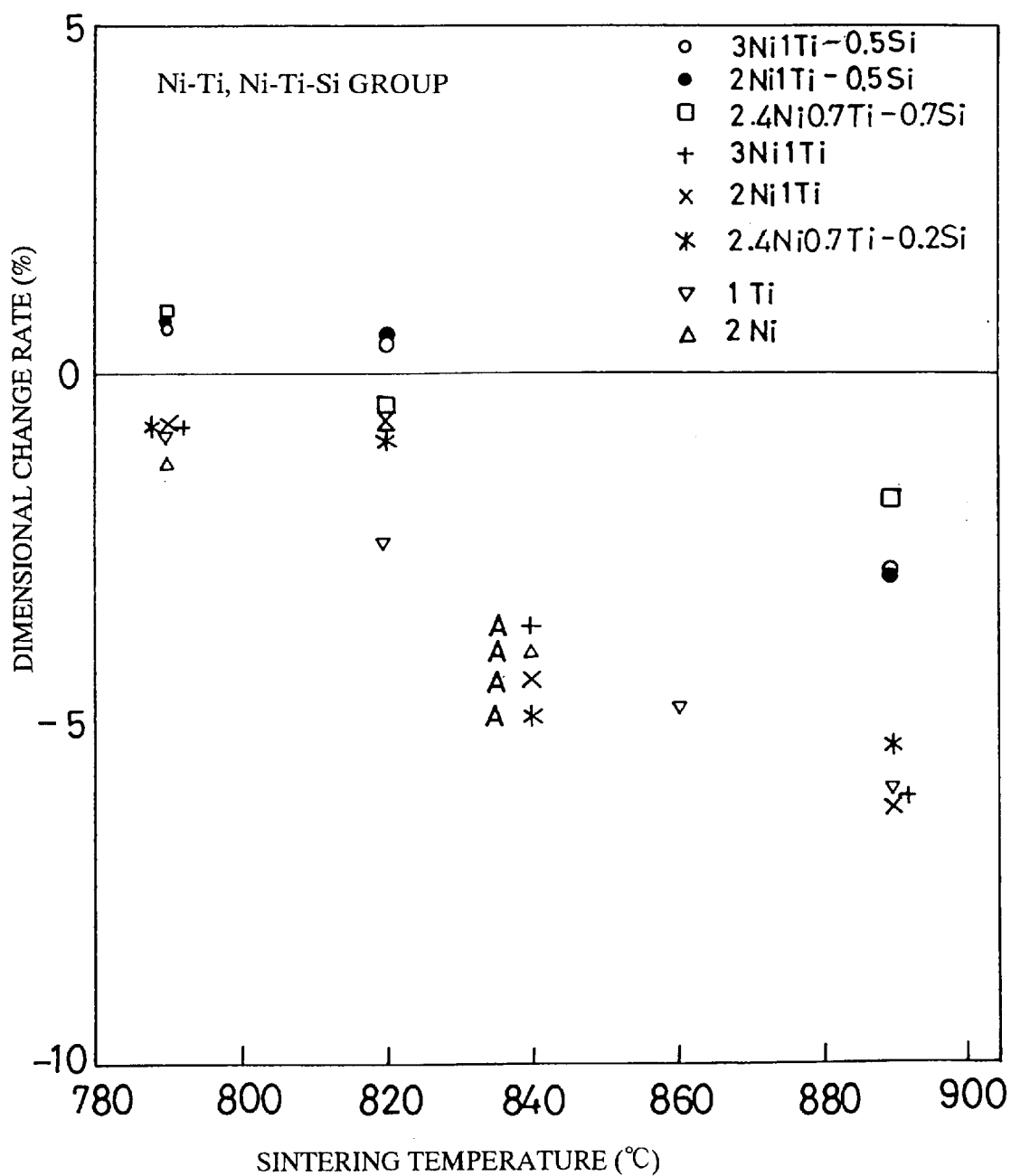
FIG. 16 is a graphical representation of the expanding/contracting behavior of samples according to the second embodiment.

FIG. 16 shows the results of measurements conducted to check the coefficients of contraction of the sinters formed by adding the additives in other examples. It is understood from FIGS. 12, 13, 14, 15 and 16 that the effect of the coexistence of Ni and Ti is not significant when the amount of TiH is small (see FIG. 16). It is also understood from these figures that the coexistence of Ni and Ti exerts the contraction restricting effect in the low temperature region, contributing to stable bonding and promotes compacting in the high temperature region. Further, Ni—Ti coexistence considerably enhances bonding strength in the interface of the steel of the bottom-closed tubular body. For example, in the case of C2 in Table 5, a remarkable effect, that is, a shearing strength of 20 to 25 kg/mm$^2$ is achieved. A more desirable result can be achieved by increasing the amount of Ni and TiH (FIGS. 13 and 14). The same effect can be obtained by addition of Co.

TABLE 4

|    | Cu20Sn | SnAt | TiH | Ni   | Si  | Al  | NiAl | NiAl$_3$ | Mo  | Mn  | Cr  | Co  | Pb   |
|----|--------|------|-----|------|-----|-----|------|----------|-----|-----|-----|-----|------|
| 1  | 50     | 0    | 0.2 | 5.0  |     |     |      |          |     |     |     |     | 0    |
| 2  | 50     | 0    | 0.2 | 5.0  |     |     |      |          |     |     |     |     | 5.0  |
| 3  | 50     | 0    | 0.2 | 5.0  |     |     |      |          |     |     |     |     | 10.0 |
| 4  | 50     | 0    | 0.2 | 10.0 |     |     |      |          |     |     |     |     | 5.0  |
| 5  | 50     | 0    | 0.2 | 10.0 | 1.0 |     |      |          |     |     |     |     | 5.0  |
| 6  | 50     | 0    | 2.0 | 10.0 |     |     |      |          |     |     |     |     | 5.0  |
| 7  | 50     | 0    | 0.2 | 10.0 |     | 1.0 |      |          |     |     |     |     | 5.0  |
| 8  | 50     | 0    | 0.2 | 10.0 |     |     | 3.0  |          |     |     |     |     | 5.0  |
| 9  | 50     | 0    | 0.2 | 10.0 |     |     |      |          | 1.0 |     |     |     | 5.0  |
| 10 | 50     | 0    | 0.2 | 10.0 |     |     |      |          |     | 1.0 |     |     | 5.0  |
| 11 | 50     | 0    | 0.2 |      | 1.0 |     |      |          |     |     |     | 5.0 | 5.0  |
| 12 | 25     | 0    | 0.2 | 10.0 |     |     |      |          |     |     |     |     | 5.0  |
| 13 | 25     | 0    | 0.2 | 5.0  |     |     |      |          |     |     |     |     | 5.0  |
| 14 | 25     | 0    | 0.2 | 5.0  | 1.0 |     |      |          |     |     |     |     | 5.0  |
| 15 | 25     | 0    | 2.0 | 5.0  |     |     |      |          |     |     |     |     | 5.0  |
| 16 | 25     | 0    | 0.2 | 5.0  |     |     | 3.0  |          |     |     |     |     | 5.0  |
| 17 | 25     | 0    | 0.2 | 5.0  |     |     |      |          |     |     | 1.0 |     | 5.0  |
| 18 | 25     | 5    | 1.0 | 2.0  |     |     |      |          |     |     |     |     | 5.0  |
| 19 | 25     | 5    | 1.0 | 3.0  |     |     |      |          |     |     |     |     | 5.0  |
| 20 | 25     | 5    | 1.0 | 2.0  | 0.5 |     |      |          |     |     |     |     | 5.0  |
| 21 | 25     | 5    | 1.0 | 3.0  | 0.5 |     |      |          |     |     |     |     | 5.0  |
| 22 | 25     | 5    | 0.7 | 2.4  | 0.2 |     |      |          |     |     |     |     | 5.0  |
| 23 | 25     | 5    | 0.7 | 2.4  | 0.7 |     |      |          |     |     |     |     | 5.0  |
| 24 | 25     | 5    | 0   | 2.0  | 1.0 |     |      |          |     | 1.0 |     |     | 5.0  |
| 25 | 25     | 5    | 0   | 3.0  | 1.0 |     |      |          |     | 1.0 |     |     | 5.0  |

TABLE 5

|      | Cu20Sn* | Cu30Zn | Sn** | TiH | NiAl | Si  | Al  | Ni  | Ti$_5$Si$_3$ | Pb  | C(Gr) | Mg  |
|------|---------|--------|------|-----|------|-----|-----|-----|--------------|-----|-------|-----|
| C 1  |         | 50.0   | 6.0  | 0.2 |      |     |     |     |              | 5.0 |       |     |
| C 2  |         | 50.0   | 6.0  | 0.2 | 3.0  |     |     |     |              | 5.0 |       |     |
| C 3  |         | 50.0   | 6.0  | 0.2 |      | 0.3 |     |     |              | 5.0 |       |     |
| C 4  |         | 50.0   | 6.0  | 0.2 |      |     | 0.5 |     |              | 5.0 |       |     |
| C 5  |         | 50.0   | 6.0  | 0.2 |      |     |     | 2.0 |              | 5.0 |       |     |
| C 6  |         | 50.0   | 6.0  | 0.2 |      |     |     |     | 2.0          | 5.0 |       |     |
| C 6' |         | 50.0   | 6.0  | 0.2 |      |     |     |     |              | 5.0 | 0.2   |     |
| C 7  |         | 50.0   | 6.0  | 1.0 |      |     |     |     |              | 5.0 |       |     |
| C 8  |         | 50.0   | 6.0  | 1.0 | 3.0  |     |     |     |              | 5.0 |       |     |
| C 9  |         | 50.0   | 6.0  | 1.0 |      | 0.3 |     |     |              | 5.0 |       |     |
| C10  |         | 50.0   | 6.0  | 1.0 |      |     | 1.0 |     |              | 5.0 |       |     |
| C11  |         | 50.0   | 6.0  | 1.0 |      |     |     | 2.0 |              | 5.0 |       |     |
| C12  |         | 50.0   | 6.0  | 1.0 |      |     |     |     | 2.0          | 5.0 |       |     |
| C13  |         | 50.0   | 6.0  | 2.0 |      |     |     |     |              | 5.0 |       |     |
| C14  |         | 50.0   | 6.0  | 2.0 | 3.0  |     |     |     |              | 5.0 |       |     |
| C15  |         | 50.0   | 6.0  | 2.0 |      | 0.3 |     |     |              | 5.0 |       |     |
| C16  |         | 50.0   | 6.0  | 2.0 |      |     | 0.5 |     |              | 5.0 |       |     |
| C17  |         | 50.0   | 6.0  | 2.0 |      |     |     | 2.0 |              | 5.0 |       |     |
| C18  |         | 50.0   | 6.0  | 2.0 |      |     |     |     | 2.0          | 5.0 |       |     |
| C18' |         | 50.0   | 6.0  | 2.0 |      |     |     |     |              | 5.0 |       | 0.5 |
| C19  | 24 + 3.6 | 33.0  | —    | 0.2 |      |     |     |     |              | 5.0 |       |     |
| C20  | 24 + 3.6 | 33.0  |      | 0.2 | 3.0  |     |     |     |              | 5.0 |       |     |
| C21  | 24 + 3.6 | 33.0  |      | 0.2 |      | 0.3 |     |     |              | 5.0 |       |     |
| C22  | 24 + 3.6 | 33.0  |      | 0.2 |      |     | 0.5 |     |              | 5.0 |       |     |
| C23  | 24 + 3.6 |        |      | 0.2 |      |     |     | 2.0 |              | 5.0 |       |     |
| C24  | 24 + 3.6 |        |      | 0.2 |      |     |     |     | 2.0          | 5.0 |       |     |
| C24' | 24 + 3.6 |        |      | 0.2 | Mn;1 |     |     |     | 2.0          | 5.0 |       |     |

TABLE 5-continued

|  | Cu20Sn* | Cu30Zn | Sn** | TiH | NiAl | Si | Al | Ni | Ti₅Si₃ | Pb | C(Gr) | Mg |
|---|---|---|---|---|---|---|---|---|---|---|---|---|
| C25 | 24 + 3.6 |  |  | 1.0 |  |  |  |  |  | 5.0 |  |  |
| C26 | 24 + 3.6 |  |  | 1.0 | 3.0 |  |  |  |  | 5.0 |  |  |
| C27 | 24 + 3.6 |  |  | 1.0 |  | 0.3 |  |  |  | 5.0 |  |  |
| C28 | 24 + 3.6 |  |  | 1.0 |  |  | 2.0 |  |  | 5.0 |  |  |
| C29 | 24 + 3.6 |  |  | 1.0 |  |  |  | 2.0 |  | 5.0 |  |  |
| C30 | 24 + 3.6 |  |  | 1.0 |  |  |  |  | 2.0 | 5.0 |  |  |
| C30' | 24 + 3.6 |  |  | 1.0 | N2A3;6 |  |  |  |  |  |  |  |

*(Cu20Sn;24% + Cu33Sn;3.6%)
**(Sn;5% + Cu33Sn;3%)

When adding Ni in a large amount such as 10 wt %, the above expansion/contraction effect can be achieved even when the amount of TiH is 2 wt %. Therefore, the upper limit amount of TiH may be about 3 wt %.

[Functional explanation of the effect of Ni addition]

A study of the effect of Ni addition has shown that single addition of Ni gives virtually no effects on expansion and contraction but when adding Ni in combination with Si or Al, the expansibility of Si or Al is developed in the low temperature region while densification is achieved in the high temperature region as Ni combines with Si or Al to form a compound in the high temperature region, decreasing the expansibility of Si or Al significantly to promote shrinkage during sintering. This effect is considered to be substantially the same as that of TiH addition. It has been verified that exactly the same effect can be obtained by Co addition. Almost the same effect can be anticipated by addition of an element such as Mn, Mo or W which has superior ability to combine with Si or Al to form a compound. As Ni can exert its effect when added in amounts which are five times the amount of Si or Al, the lower limit amount of Ni may be about 0.5 wt %. In view of cost, the upper limit amount of Ni may be about 20 wt %. For achieving a satisfactory, stable effect, the preferred amount of Ni is in the range of from 2 wt % to 5 wt %.

[The functions of other alloy elements]

Figure 17:
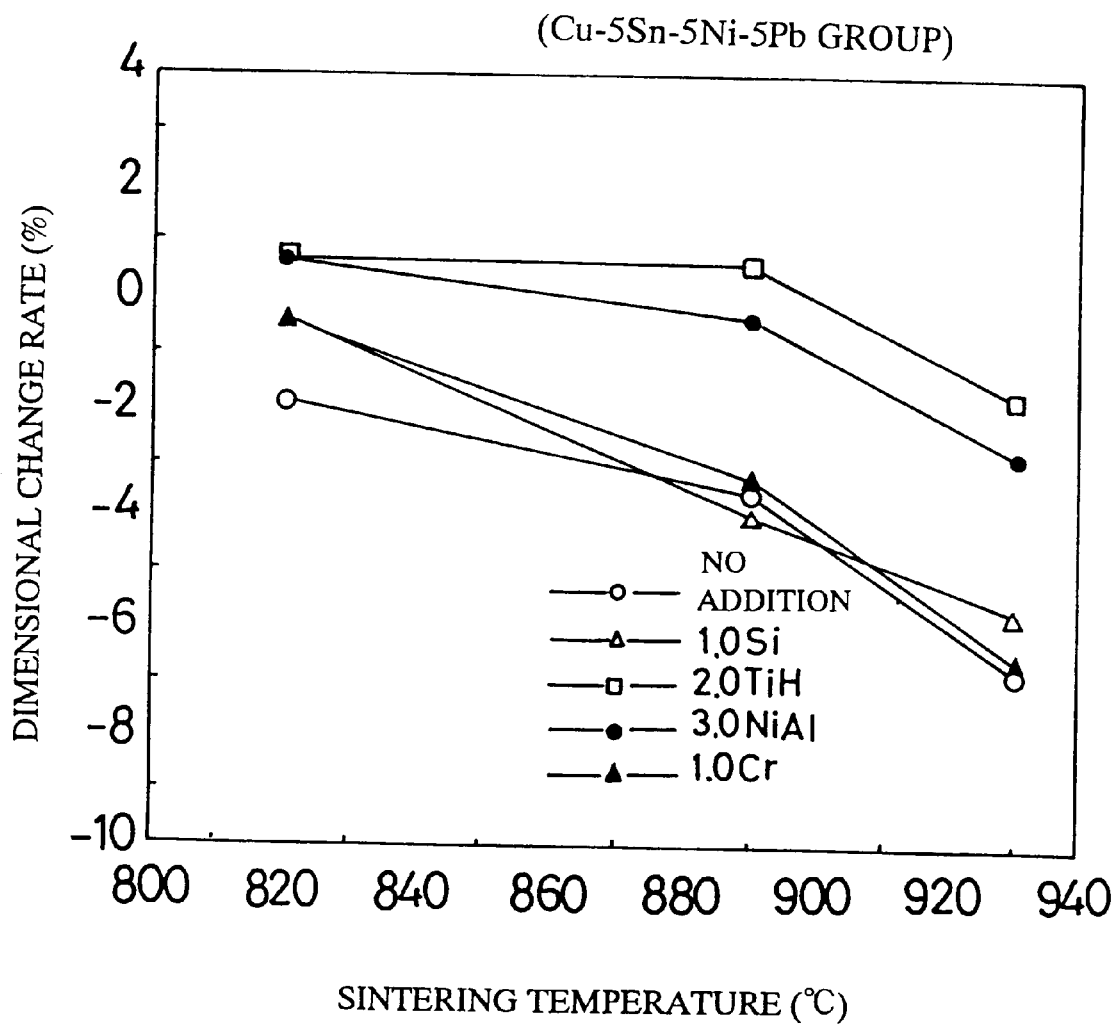
FIG. 17 is a graphical representation of the expanding/contracting behavior of samples according to the second embodiment.

FIG. 17 shows the dimensional change rates of the sinters formed by adding the additives in the examples shown in FIGS. 13, 14, 15 and in other examples. It is understood from FIG. 17 that Cr and Mn can be used in the invention as they meet the requirements of the principle of the invention. Cr exerts expansibility in the low temperature region and contractibility in the high temperature region similarly to Si and TiH, and it is therefore understood that Cu has the same effect as Si, Al and TiH.

[The effect of Zn addition]

FIG. 18, 19, 20, 21 and 22 show the dimensional change rates of the sinters formed by adding the additives in other examples.

It is understood from these graphs that when adding Zn alone, Zn exerts its expansibility in the low temperature region and sequentially exerts considerable contractibility in the high temperature region. The reason for this is that Zn has the same function as Si and Al in terms of the stabilization of the β phase in the C—Zn materials (FIG. 18).

When adding Zn in combination with Si or Al, expansibility in the low temperature region is enhanced by the coexistence of Zn and more increased as the amount of Zn increases. The coexistence of Zn has the effect of achieving contractibility in the high temperature region without use of Ti or Ni when the amount of Al is in a certain range. These effects are inherent to Zn and distinct from the effects of other additives (FIGS. 18, 19, 20, 21, 22). Although the degree to which Zn can obtain desired effects differs from those of other additives, combinational addition of Zn is regarded as a useful means in view of the increased degree of freedom in the range of alloy compositions. Ni, graphite and Mg have no considerable difference in behavior between the case where each of these elements was added in combination with Zn and the case where each element was added without Zn. It is therefore understood that Ni, graphite and Mg, basically, do not interact with Zn to a noticeable extent.

Figure 18:
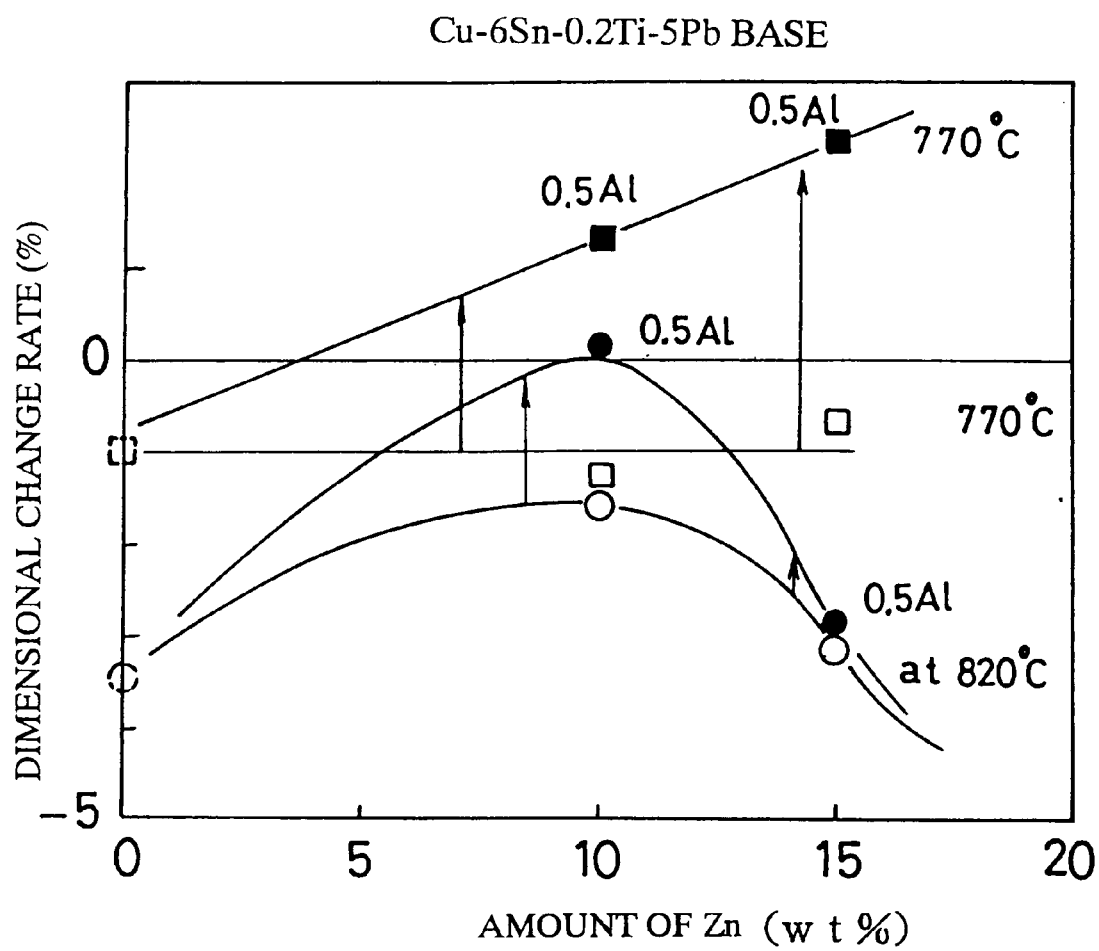
FIG. 18 is a graphical representation of the expanding/contracting behavior of samples according to the second embodiment.
Figure 19:
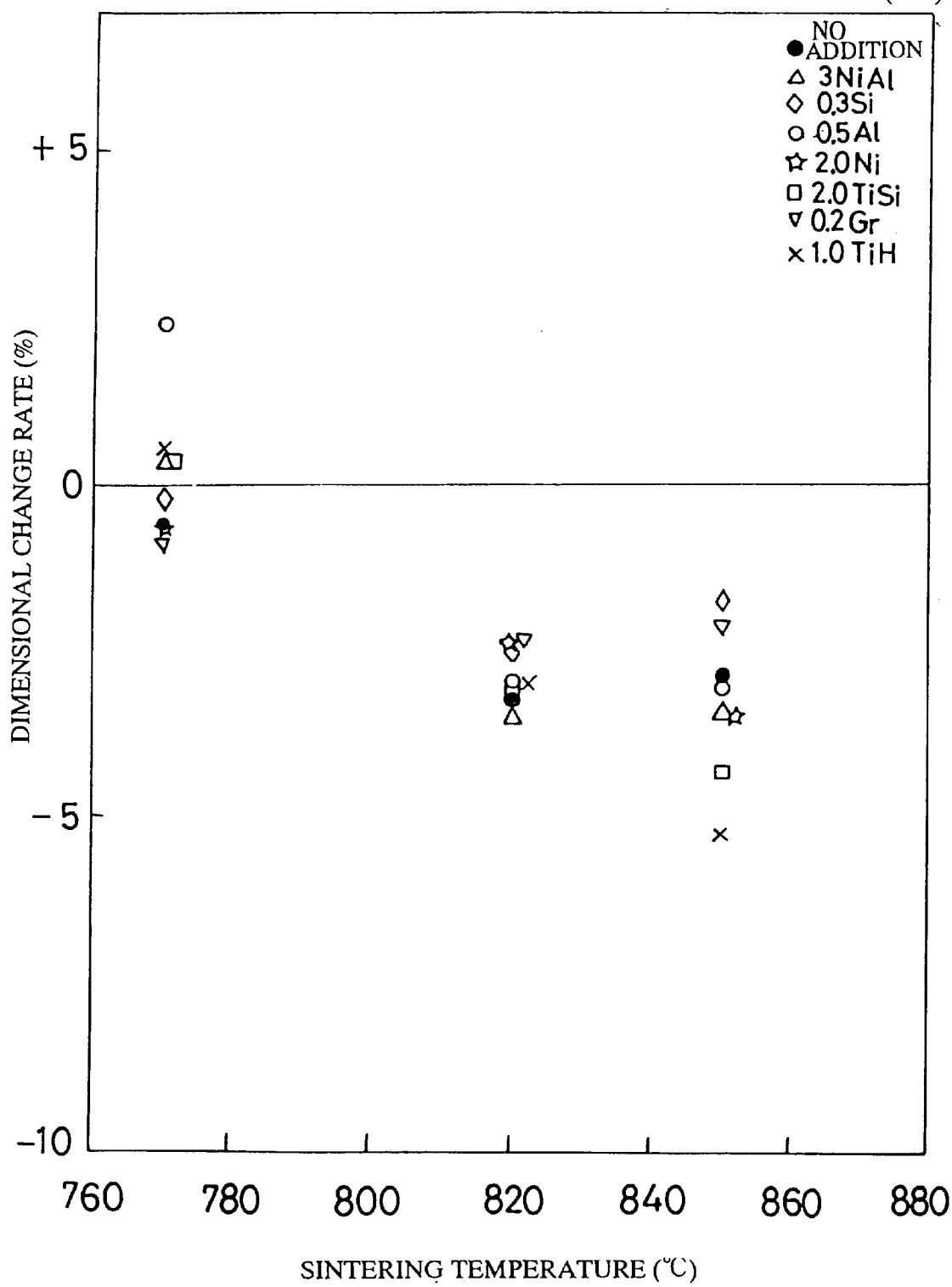
FIG. 19 is a graphical representation of the expanding/contracting behavior of samples according to the second embodiment.
Figure 20:
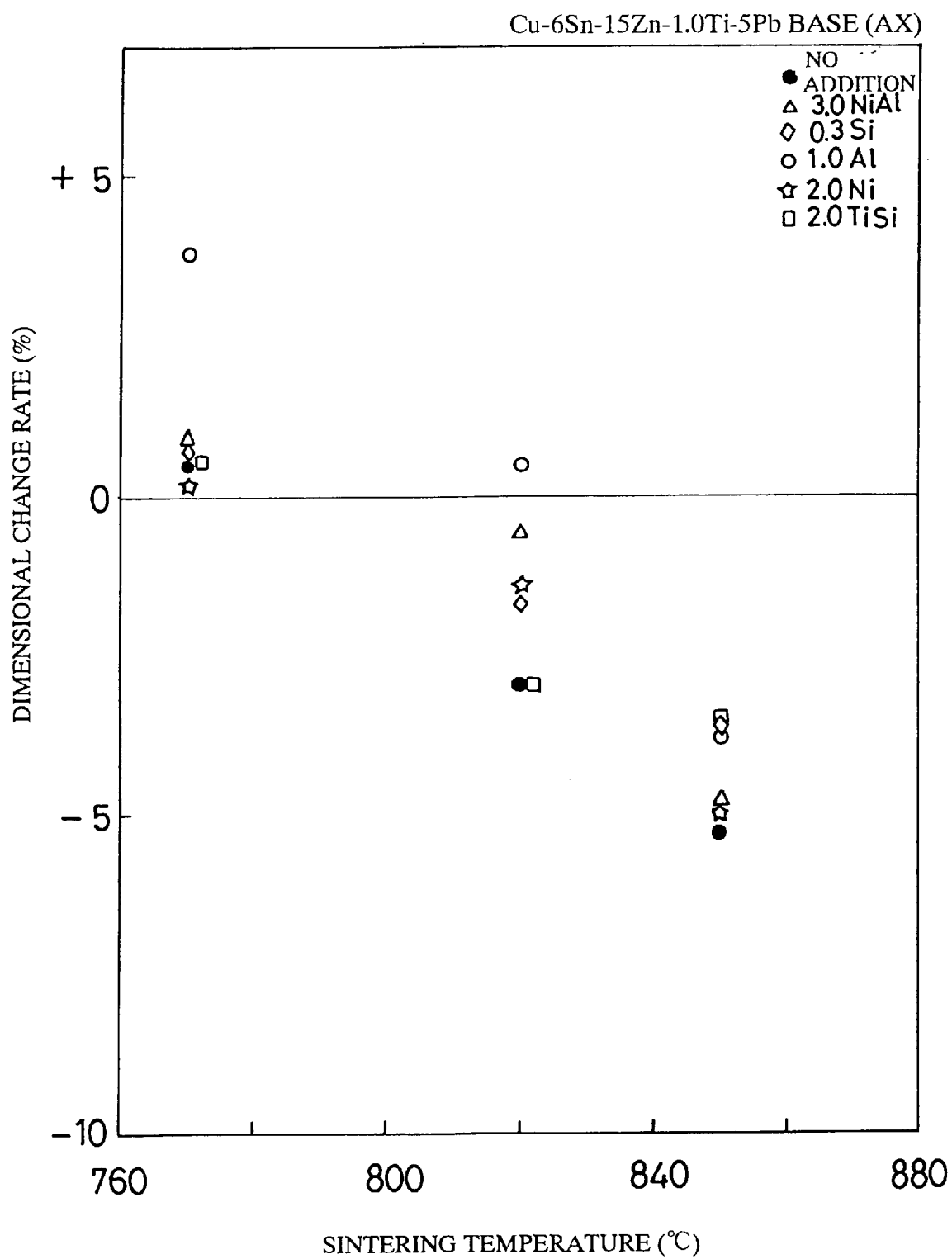
FIG. 20 is a graphical representation of the expanding/contracting behavior of samples according to the second embodiment.
Figure 21:
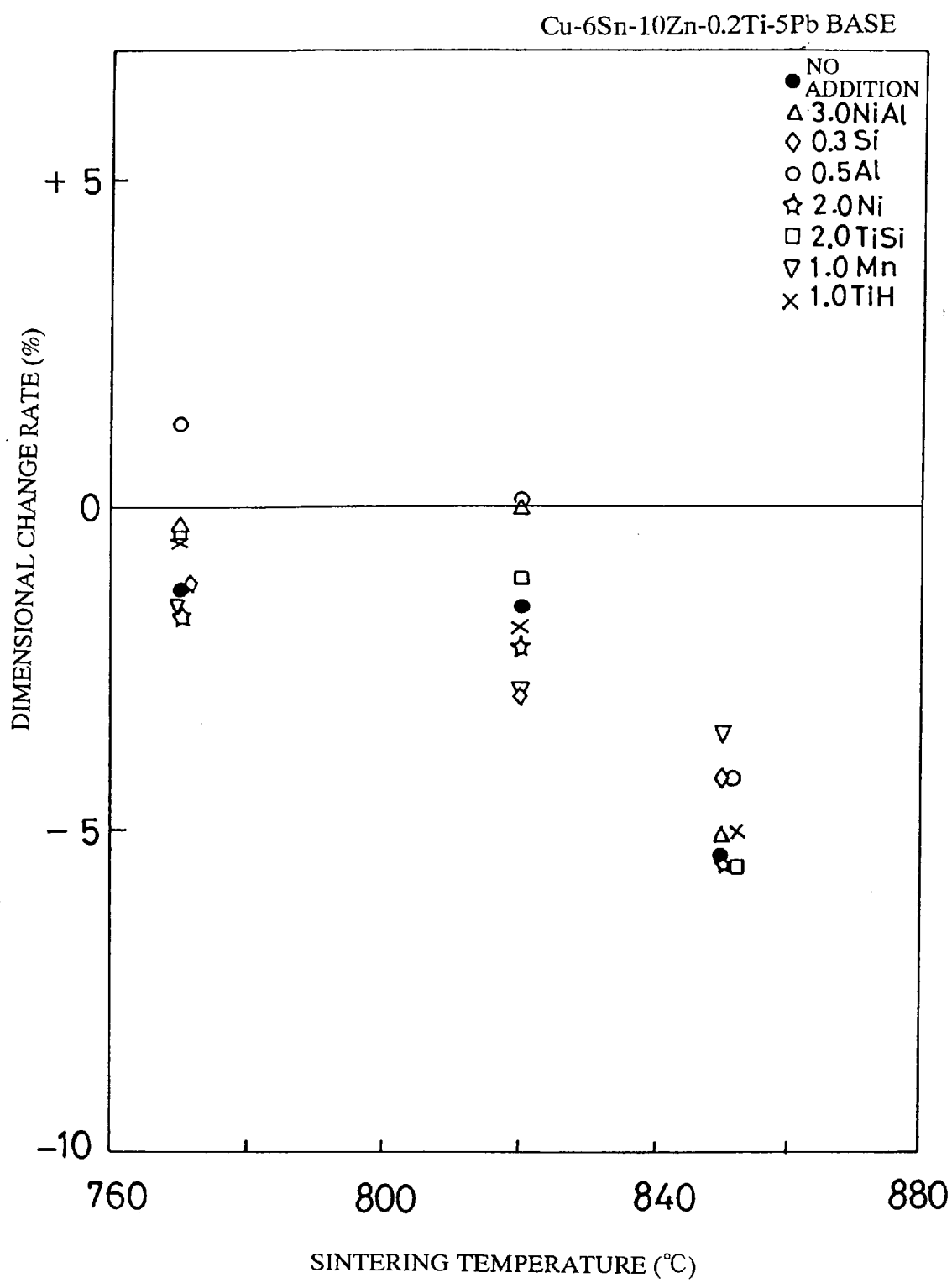
FIG. 21 is a graphical representation of the expanding/contracting behavior of samples according to the second embodiment.
Figure 22:
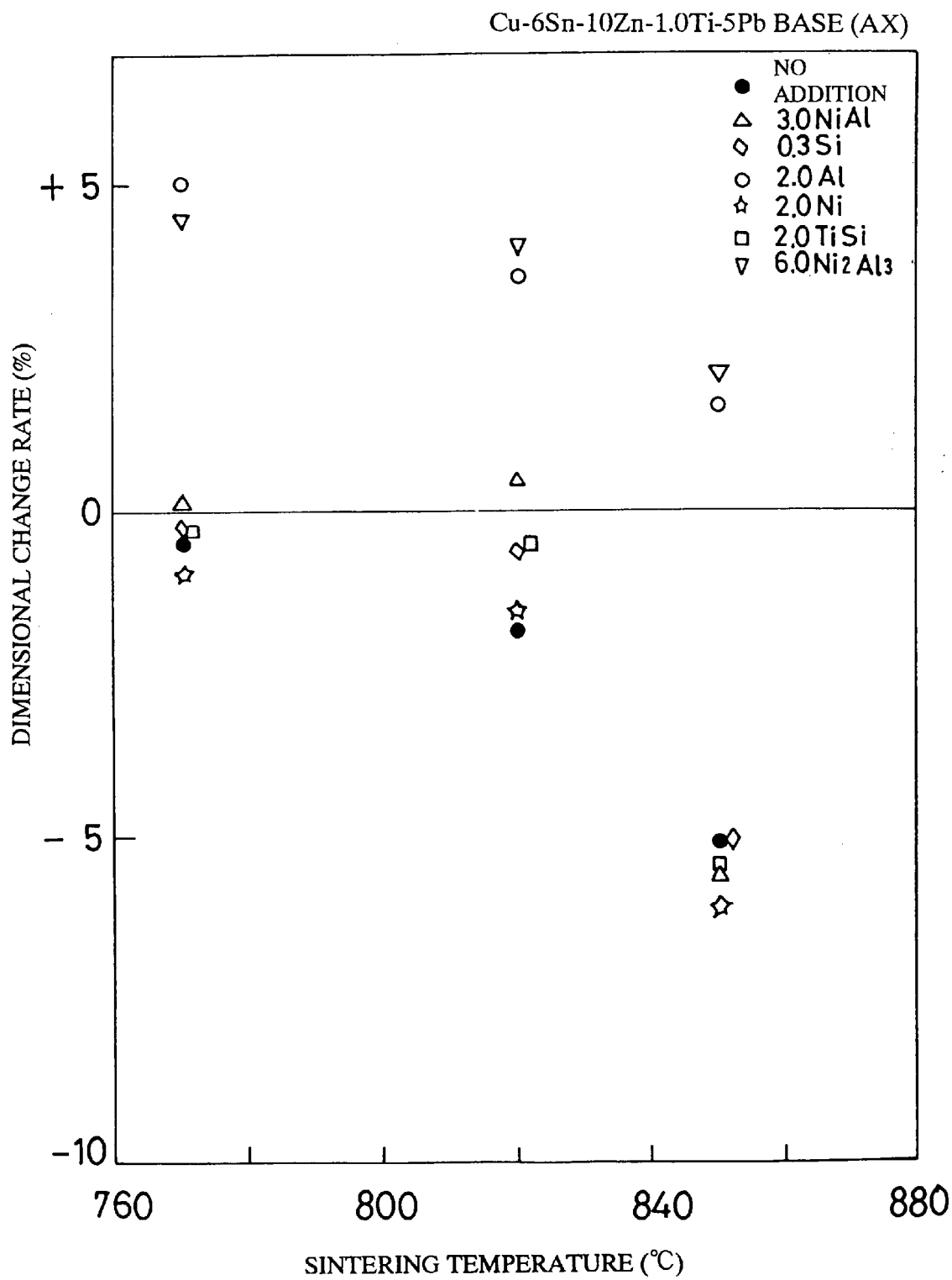
FIG. 22 is a graphical representation of the expanding/contracting behavior of samples according to the second embodiment.

The lower limit amount of Zn may be 0 wt %, because expandability increases in proportion to the amount of Zn at low temperatures, for example, when Zn is added together with 0.5 wt % of Al as shown in FIG. 18.

The upper limit amount of Zn may be about 30 wt % in view of the difficulty in molding when Zn is added as a master alloy. The amount of Zn affects the expanding temperature of the sinter as set forth above, and therefore the preferable amount of Zn should be adjusted in conjunction with the amount of other additives such as Sn, Pb and TiH.

When the amount of Zn exceeds 20 wt %, it is desirable in consideration of the evaporating characteristic of Zn to sinter the green compact under a pressurized atmosphere in the presence of inert or reducing gas such as $N_2$ gas, which gives the effect of increasing sintered density in the high temperature region.

[Expansion in the low temperature region required for joining]

Figure 23:
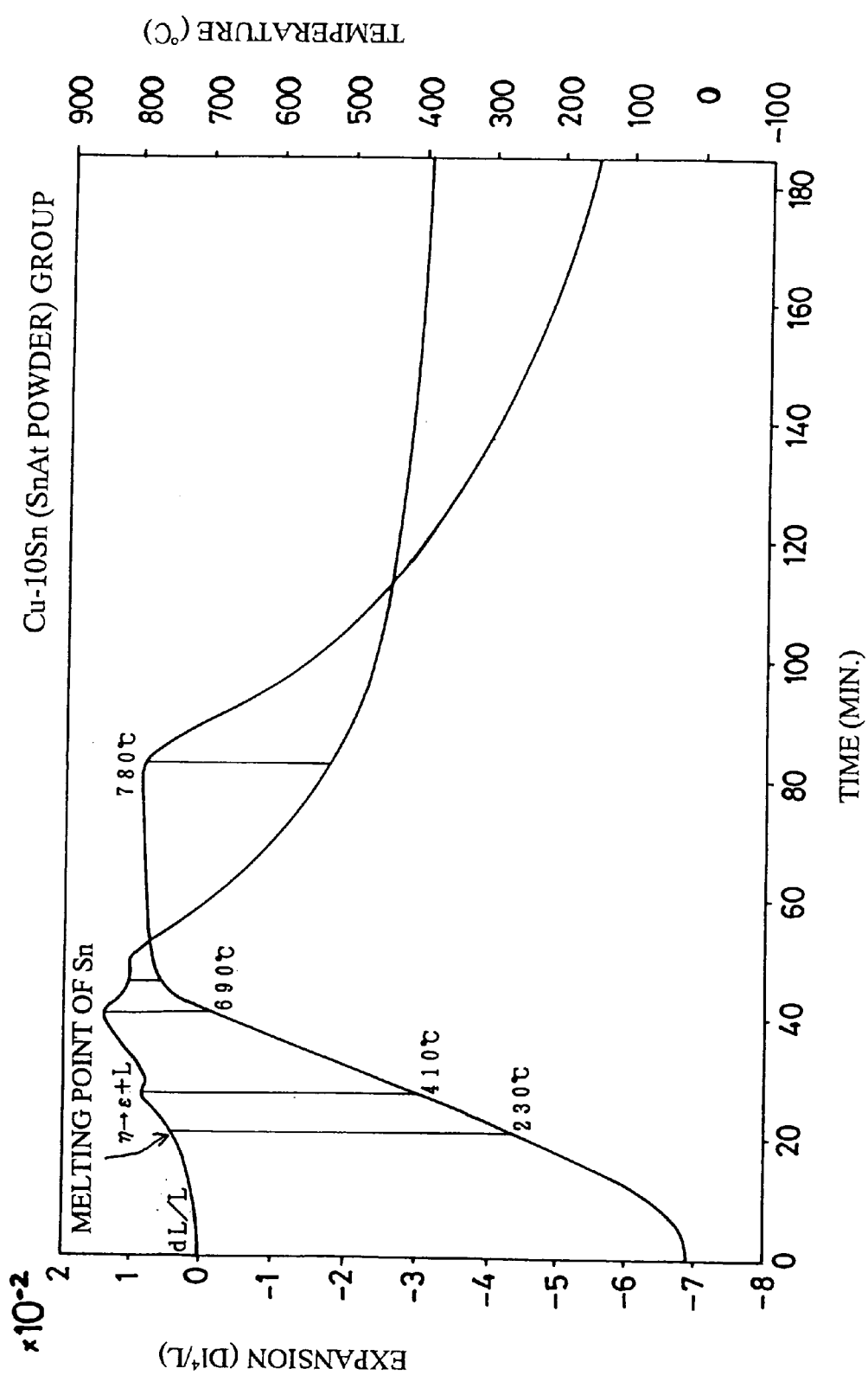
FIG. 23 is a graphical representation of the expanding/contracting behavior of samples according to the second embodiment.
Figure 24:
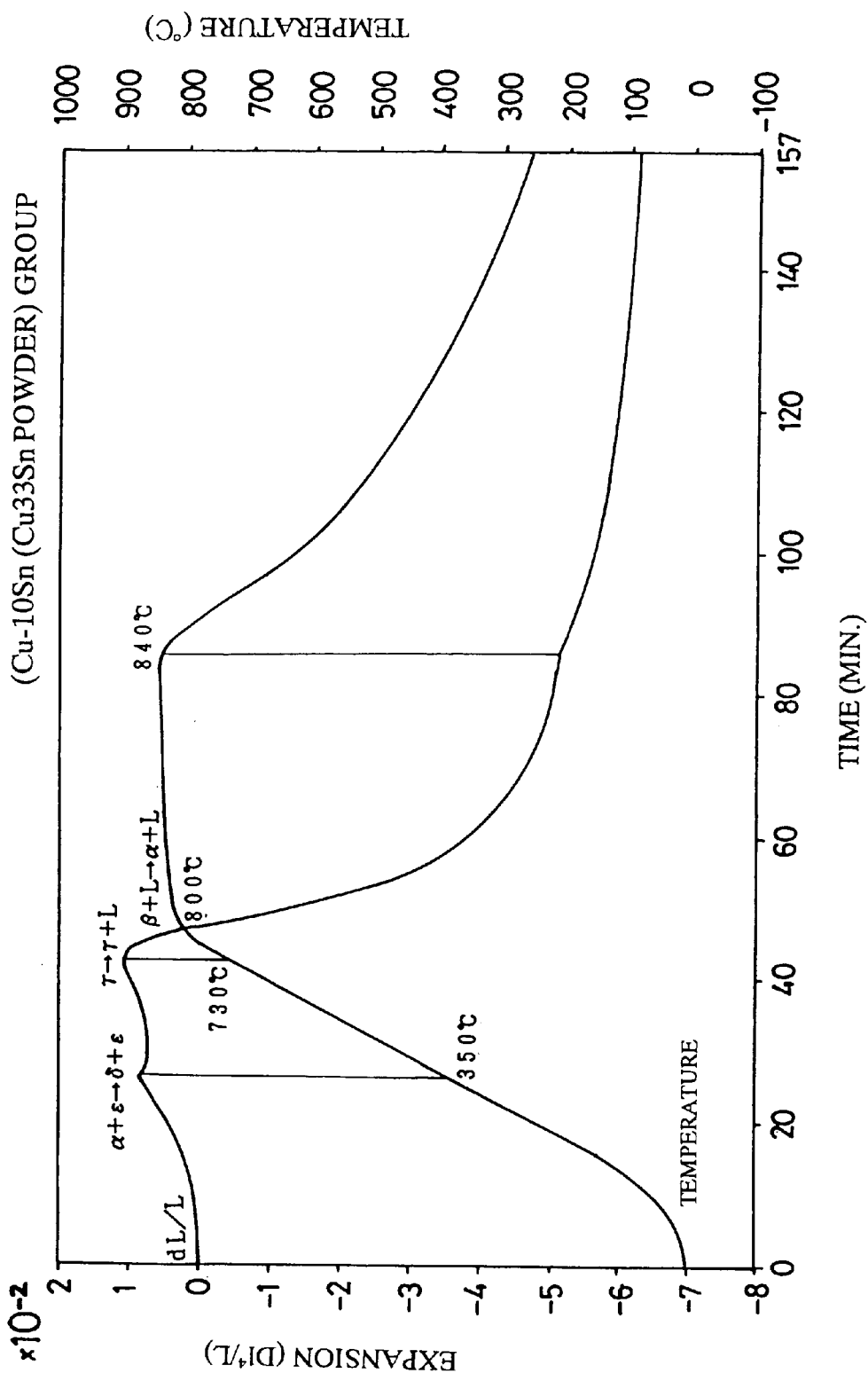
FIG. 24 is a graphical representation of the expanding/contracting behavior of samples according to the second embodiment.
Figure 25:
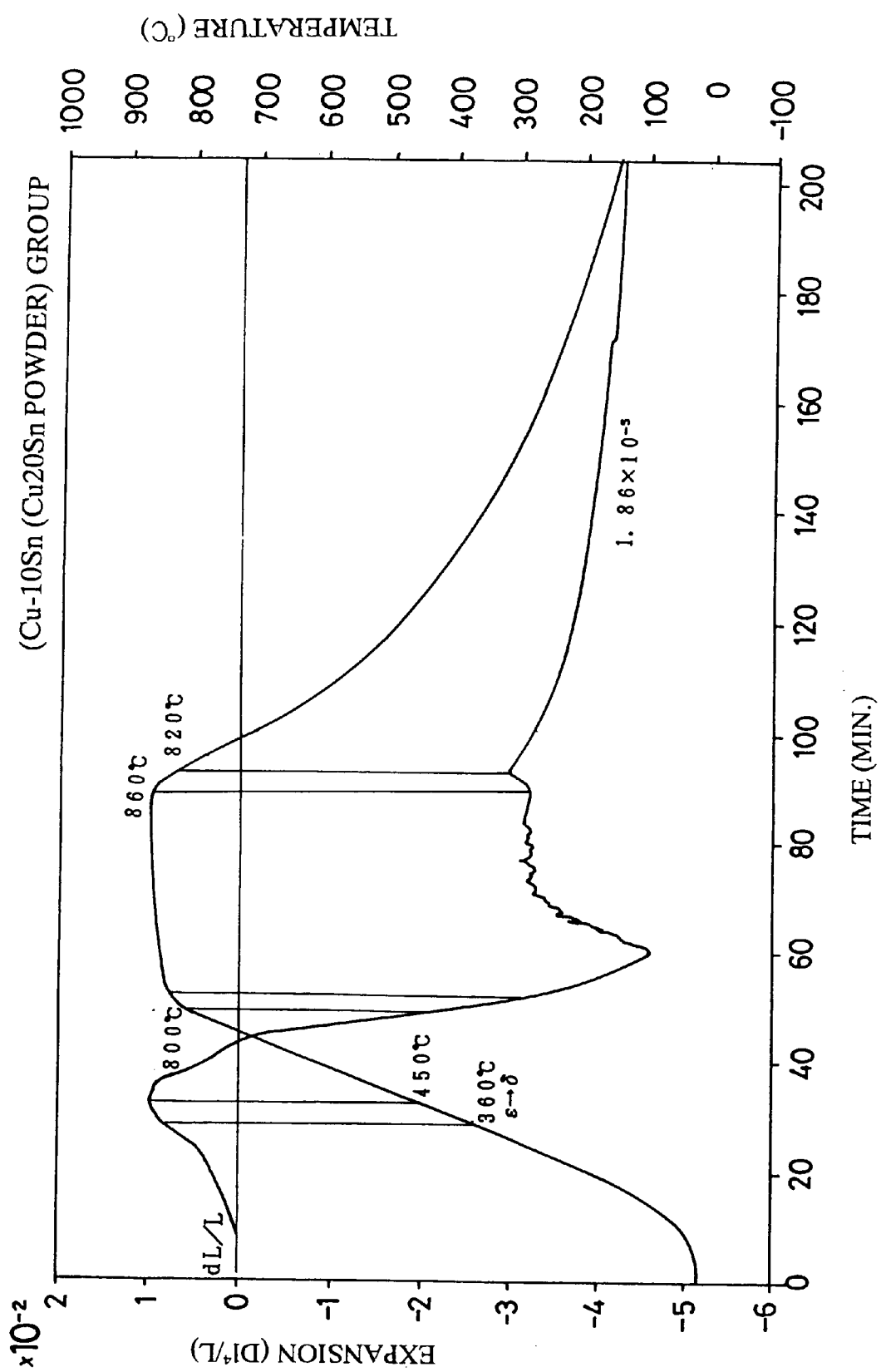
FIG. 25 is a graphical representation of the expanding/contracting behavior samples according to the second embodiment.

FIGS. 23, 24 and 25 show the dimensional change rates of the sinters formed by adding the additives in other examples. As seen from FIGS. 23 to 25, the green compacts each containing a powder behave in various expanding patterns with rising temperature. The cause of the expanding behavior was investigated, using Hansen's constitution diagram. It is conceivable from the investigation that the generation of the intermetallic compound phases called η, ε, γ and β phases concerns the expanding behavior and that the emergence of a liquid phase due to the disappear of a compound changes the behavior of the material from expansion to contraction. Therefore, the emergence pattern of expansion/contraction varies according to Sn sources. For example, in the case of Cu—33Sn, great expansion (730° C.) due to the emergence of the γ phase and very small expansion due the emergence of the β phase are admitted. In the case of Cu—20Sn, expansion due to a transition from the δ phase to the γ phase and β phase is admitted.

Figure 26:
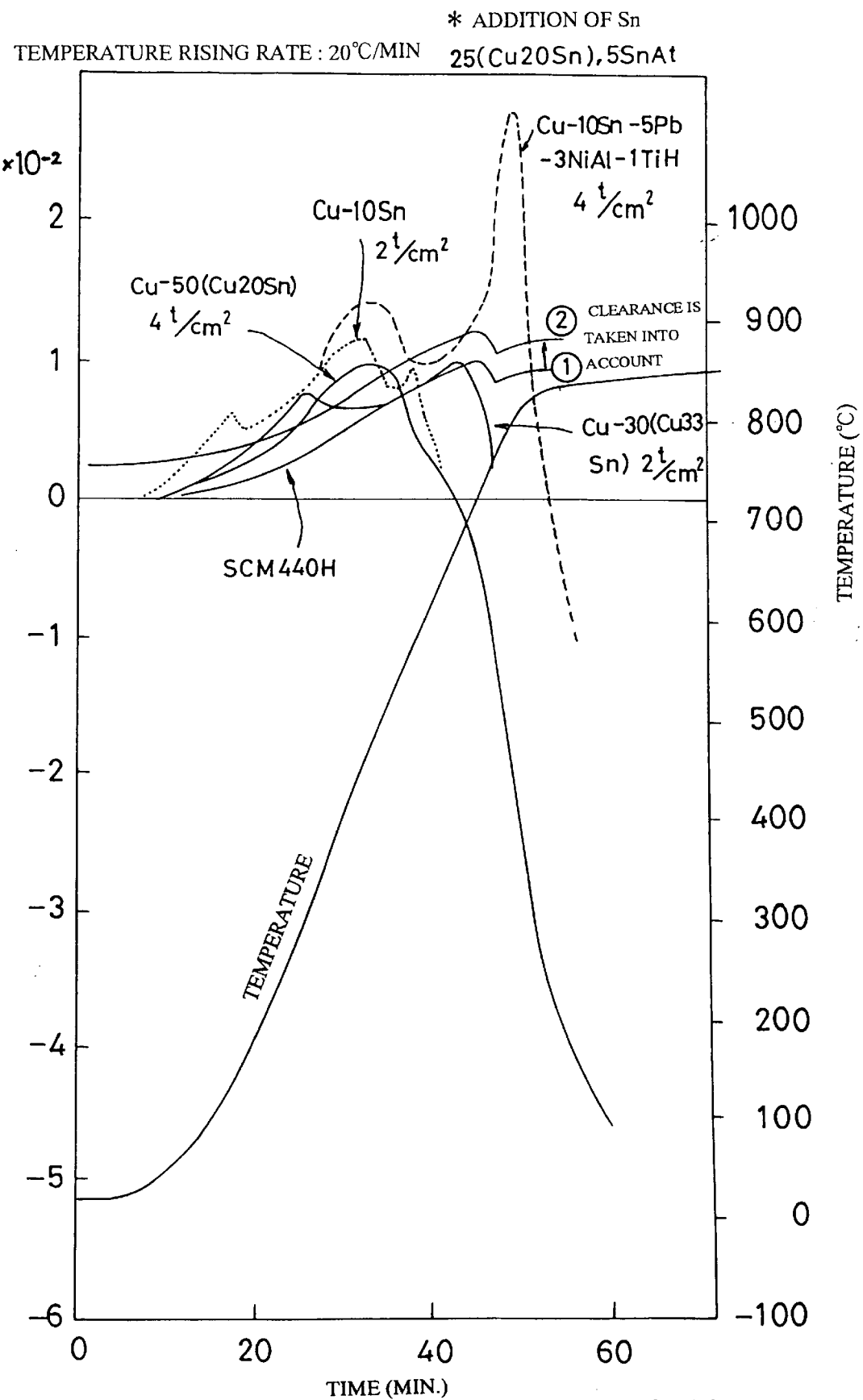
FIG. 26 is a graph for explaining the emergence of a β phase in samples.

The results of Sn addition in various ratios and combinations are summed in the graph of FIG. 26. As seen from this graph, expansion reaction due to the emergence of the β phase in the high temperature region, which is very useful for joining, is very small in amount and even smaller than the volume of thermal expansion (coefficient of thermal expansion=18×10⁻⁶) in all of the examples shown in FIG. 26, and it is therefore found that great expansion required for joining cannot be obtained by simply changing the Sn source. In the graph of FIG. 26, solid line (1) represents the thermal expansion/contraction curve of steel (SCM440H) and solid line (2) represents the thermal expansion/contraction curve of steel when taking into account the clearance (50 μm per φ25 mm) between the outside diameter of the thin-walled tubular compact body (Cu-base pipe material) and the bore of the bottom-closed tubular body. It is understood, from the comparison between the curve representing each example and the curves (1) and (2), that the expansion for achieving the required bonding ability cannot be obtained by addition of Sn. Of these examples, Cu—33Sn is the most suitable. In the case of Cu—20Sn, the amount of Cu20Sn powder is so large that contraction due to solid phase sintering is not negligible and the new emergence of the β phase cannot be expected at temperatures equal to and more than the peritectic temperature of the Cu—Sn material. Therefore, expansion necessary for joining cannot be expected from addition of Cu—20Sn.

In should be noted that in the above examples, sintering was performed by heating each copper-base powder material according to its composition to a temperature at which satisfactory compactness (preferable relative density=85% or more) could be achieved.

The principle of the invention is to obtain expansion in the high temperature region which is useful in joining. In other words, the emergence of a liquid phase necessary for joining and the new emergence of the β phase are developed by using the alloying technique and utilized in joining. By way of example, Cu20Sn alloy powder was used as an Sn source to prepare a base material in which expansion due to the β phase does not occur. 3 wt % of NiAl and 1 wt % of TiH were then added to this base composition thereby to prepare an alloy. The thermal expansion/contraction curve of this alloy is graphically shown. It is understood from this characteristic curve that extremely remarkable expansion can be caused by the emergence of the β phase, which is greater than the expansion of steel indicated by the characteristic curves (1) and (2) so that satisfactory bonding ability can be ensured.

Figure 27:
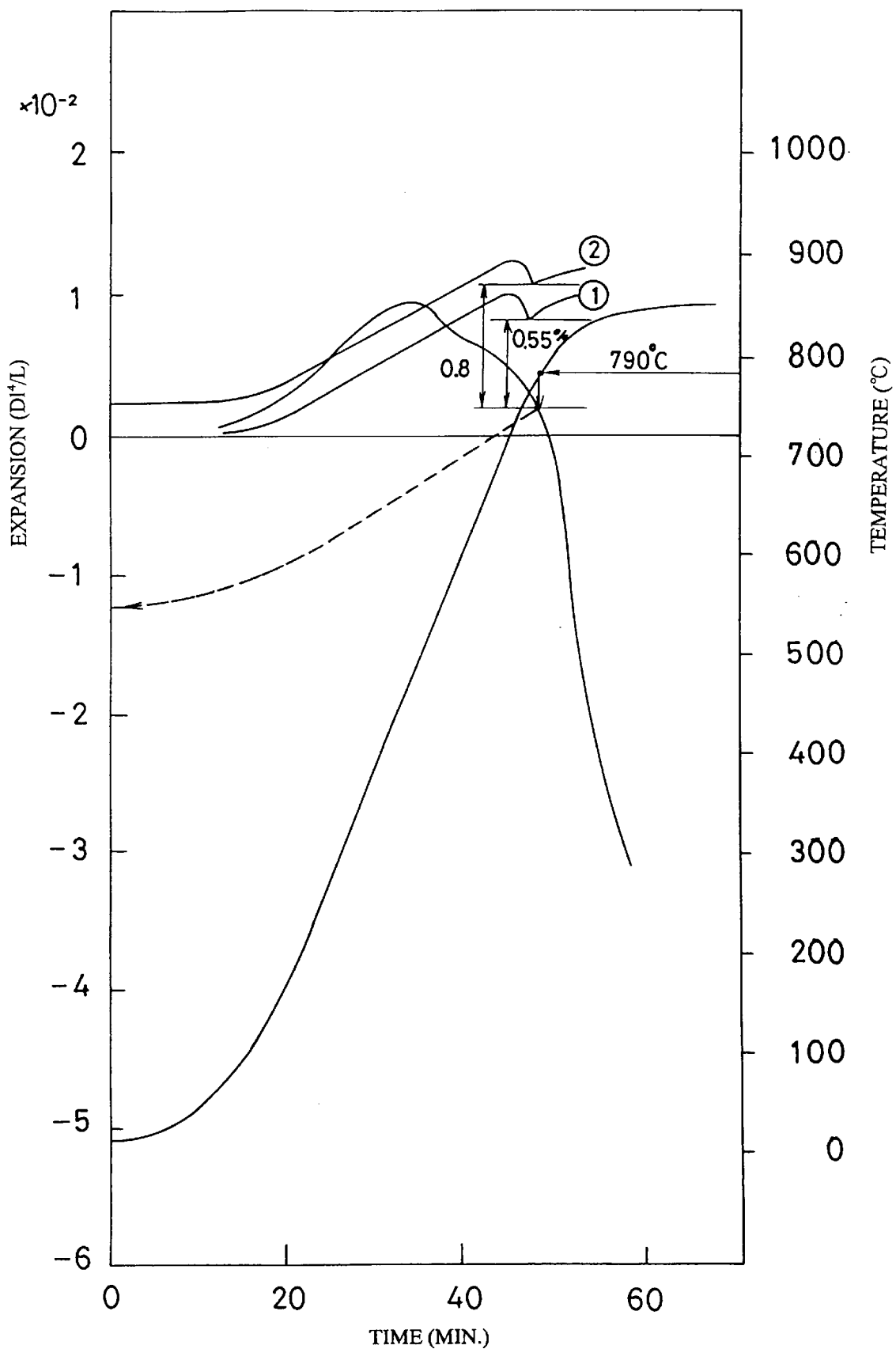
FIG. 27 is a graph for explaining the volume of expansion required.

The volume of expansion necessary for joining has been investigated, using the graph of FIG. 8 as data. The result of the study is shown in FIG. 27. This graph was prepared based on the measurement results shown in FIG. 26 and based on the facts that the coefficient of expansion of the Cu-base sintering materials is 18×10⁻⁶ when they are expanded from a thermal contraction state (cooled state) and that the dimensional change rate of the Cu—10Sn—5Pb materials is −1.2%. When the clearance between the thin-walled tubular compact body and the bore of the bottom-closed tubular body is zero, the expansion volume obtained by addition of an alloy element is 0.5% of the parent alloy. When the clearance is 50 μm, sinter-joining is substantially possible by an expansion volume of about 0.8% (per φ25 mm). Although the reason for this conforms to the results described above, it is desirable, in consideration of the stability of joining and variations in processing, to obtain an expansion volume equal to or more than 1% of the volume of the base alloy. If the amount of a component of the steel (for example, carbon content) is changed, the α/γ transformation point of the steel is changed as well and it is therefore necessary to take the expansion volume of the Cu-base pipe material into account. This problem can be however solved by controlling the expansion volume of the Cu-base sinters beforehand by adding an alloy element such that the contraction volume at the α/γ transformation point can be compensated by an expansion volume of about 0.25%. Specifically, the expansion volume is increased by 0.25% of the base material so that the expansion volume required is 1.05%.

[Investigation of expansive alloy elements]

When adding an element which stabilizes the β phase in the Cu—Sn alloy constitution diagram, the β phase newly appears to a considerable extent following the emergence of a liquid phase so that great expansion reaction can be expected in this reaction area. To achieve such expansion reaction, alloy elements to be added are selected so as to meet the following two conditions.

(1) Eutectic and peritectic alloy elements, which stabilize the β phase in Cu containing alloys such as Cu—Sn alloys, are selected form Hansen's constitution diagram.

Examples of the alloy elements which satisfy the above requirement are Al, Si, Ga, Be, In, Sb and Zn. Of these alloy elements, Al is the most effective in view of the β phase stabilizing effect, and Si and Zn are also suitable elements from a practical viewpoint. The essential factor for the expansion reaction is presumably the precipitation of the β phase caused by the reaction of the expansive elements with a liquid phase generated during sintering. Taking this into account, it can be easily presumed that Al, Si and Zn may be added in the form of a compound such as NiAl or in the form of a master alloy. The effect of Ga, Be, In and Sb is basically the same as that of Al, Si and Zn.

(2) In order to stabilize the β phase similarly to the requirement (1), even if the β phase does not exist in Cu alloys, the alloy elements should have at least the BCC crystal structure identical with the β phase and form a solid solution with Cu to some extent.

Examples of such alloy elements are Ti, Zr and Fe. It should be noted that these elements have a smaller expansion effect than the elements listed in (1).

[Investigation of elements capable of promoting densification in the high temperature region]

Since addition of an expansive element retards the densification of the sinter in the high temperature region, causing undesirable material characteristics, it is necessary to promote densification within a specified range of temperature.

(1) In order to promote densification, the forms of precipitates may be changed so that the β phase stabilizing function of the expansive element such as Si or Al can be restricted at temperatures equal to and more than 850° C. For example, the β phase may be changed to Ni3Si, TiAl, Ni3Ti or TiSi and C may be changed to TiC.

In view of the above principle, elements which form a stabile intermetallic compound when mixed with an expansive element such as Ti, Ni, Fe, Mn, Cr or Co can be used for promoting densification in the high temperature region.

(2) Basically, the sintered density of the sinter can be increased by increasing the quantity of a liquid phase during liquid-phase sintering. In view of this fact, Pb, Zn, P, Ag, In and many other elements are conceivably used, but the above elements are more practical. It is understood from the above explanation that Ti and Zn have an expanding function as well as a contracting function at high temperatures.

Figure 28:
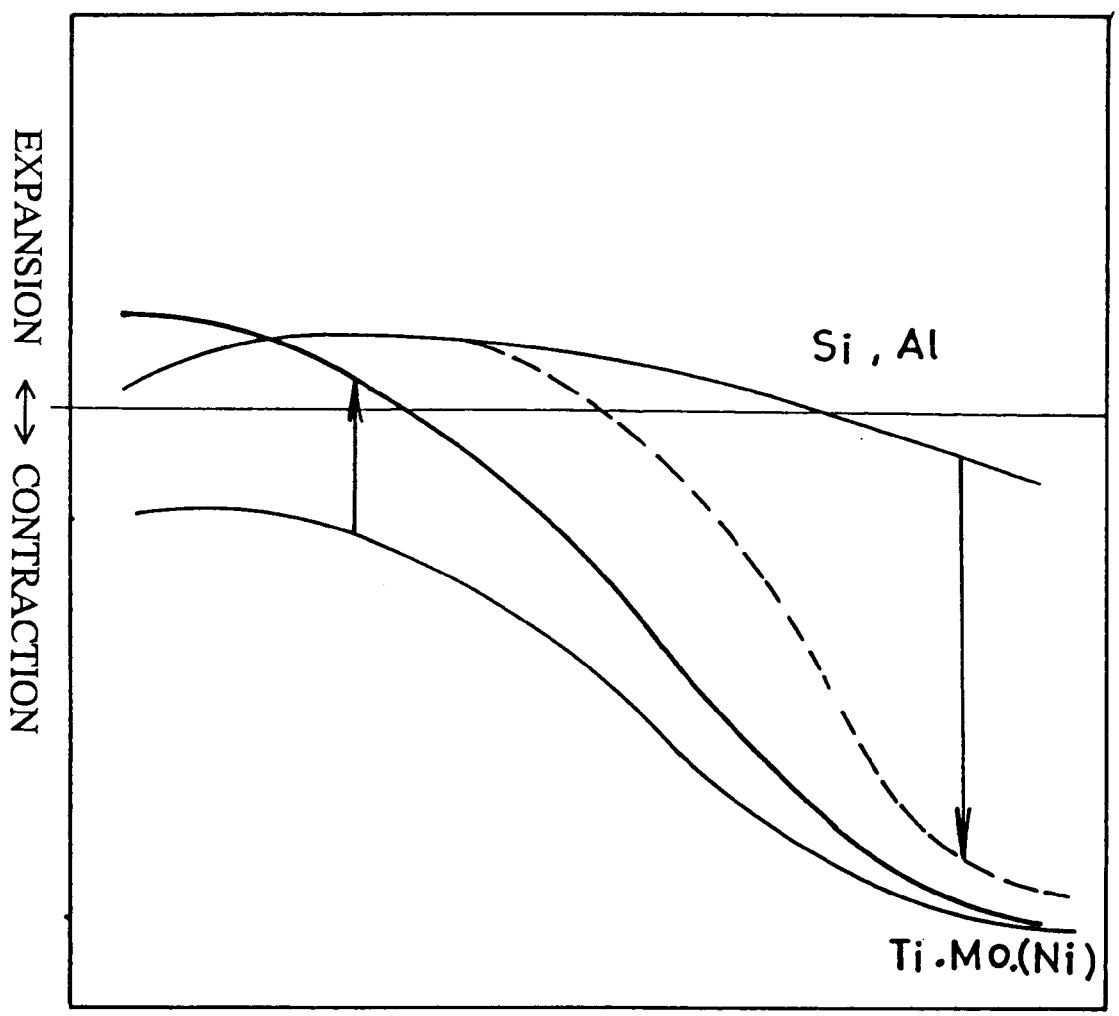
FIG. 28 is a graph for explaining the principle of the invention.

As has been described above, one of the features of the invention resides in that a copper-base material is expanded at low sintering temperatures so as to be brought into pressure contact with an iron-base material for joining and contracted at high sintering temperatures to obtain compactness necessary for forming a sinter, as graphically shown in FIG. 28. In this method, bonding ability can be increased by decreasing the temperature rising rate in sintering in the low temperature region and or by heating the material at the same temperature for a specified time in the low temperature region. The scope of the invention includes sinter-joining in which the copper-base material is not brought into pressure contact with the iron-base material, but simply brought into contact with the iron-base material. This case provides the advantage that when the copper-base material is joined to the iron-base material by sinter-ing at low temperatures, the contraction of the copper-base material does not cause a shift of the copper-base material from the iron-base material in an unexpected direction.

The sinter-joining method and the sintered composite member according to the invention are applicable, for example, to the manufacture of cylinder blocks.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A sinter-joining method for joining a copper-base material to an iron-base material, the method comprising the steps of:
    (a) heating the copper-base material, which is composed of at least three components including at least one of: (i) at least one metal and (ii) at least one semi-metallic element which has ability to give expansibility, in contact with a bore of the iron-base material at temperatures equal to and higher than 600° C. for a specified time so that the copper-base material expands and joins to the iron-base material, and
    (b) further heating the copper-base and iron-base materials at temperatures equal to and higher than 800° C. to increase the compactness of the copper-base material.

2. A sinter-joining method according to claim 1,
    wherein the bore of the iron-base material has a tubular shape and the copper-base material is a tubular copper-base member having an outside diameter that is substantially equal to or slightly smaller than the diameter of the bore of the iron-base material, and
    wherein the tubular copper-base member and the iron-base material are heated at a temperature of at least 600° C. while the tubular copper-base member being inserted in the bore of the iron-base material.

3. A sinter-joining method according to claim 1 or 2,
    wherein the copper-base material contains a Cu—Sn component and at least one of a metal and a semi-metallic element which stabilizes the β phase of the Cu—Sn alloy or a phase similar to the β phase of the Cu—Sn alloy, as an element for promoting expansibility.

4. A sinter-joining method according to claim 3, wherein said element that stabilizes the β phase or phase similar to the β phase is at least one element selected from the group consisting of Al, Si, Ga, Be, In, Sb, Zn, Ti, Zr, Mn, Cr, and Co.

5. A sinter-joining method according to claim 3, wherein the copper-base material contains an element which inhibits the stabilizing function of the element for stabilizing the β phase or phase similar to the β phase.

6. A sinter-joining method according to claim 5, wherein said element that inhibits the stabilizing function of the element for stabilizing the β phase or phase similar to the β phase is at least one element selected from the group consisting of Ti, Pb, Zn, P, Sb, Ag, In, Ni, Co, Mn, Fe and Cr.

7. A sintered composite member, comprising a copper-base material and an iron-base material, said copper-base material and said iron base material being sinter-joined,
    the sinter-joining includes: (a) the copper-base material being heated in contact with a bore of the iron-base material at temperatures equal to and higher than 600° C. for a specified time so that the copper-base material expands and joins to the iron-base material, and the copper-base material being composed of at least three components including at least one of: (i) at least one metal and (ii) at least one semi-metallic element which has ability to give expansibility, and (b) the copper-base and iron-base materials being further heated at temperatures equal to and higher than 800° C. to increase the compactness of the copper-base material.

8. The sintered composite member according to claim 7, wherein the bore of the iron-base material has a tubular shape and the copper-base material is a tubular copper-base member having an outside diameter that is substantially equal to or slightly smaller than the diameter of the bore of the iron-base material, and
    wherein the tubular copper-base member and the iron-base material are heated at a temperature of at least 600° C. while the tubular copper-base member being inserted in the bore of the iron-base material.

9. The sintered composite member according to claim 7 or 8, wherein the copper-base material contains a Cu—Sn component and at least one of a metal and a semi-metallic element which stabilizes the β phase of the Cu—Sn alloy or a phase similar to the β phase of the Cu—Sn alloy, as an element for promoting expansibility.

10. The sintered composite member according to claim 9, wherein said element that stabilizes the β phase or phase similar to the β phase is at least one element selected from the group consisting of Al, Si, Ga, Be, In, Sb, Zn, Ti, Zr, Mn, Cr, and Co.

11. The sintered composite member according to claim 9, wherein the copper-base material contains an element which inhibits the stabilizing function of the element for stabilizing the β phase or phase similar to the β phase.

12. The sintered composite member according to claim 11, wherein said element that inhibits the stabilizing function of the element for stabilizing the β phase or phase similar to the β phase is at least one element selected from the group consisting of Ti, Pb, Zn, P, Sb, Ag, In, Ni, Co, Mn, Fe and Cr.

* * * * *